(12) United States Patent
Kwon

(10) Patent No.: US 10,194,477 B2
(45) Date of Patent: Jan. 29, 2019

(54) METHOD AND APPARATUS FOR CONTROLLING A DEVICE USING BLUETOOTH TECHNOLOGY

(71) Applicant: LG ELECTRONICS INC., Seoul (KR)

(72) Inventor: Younghwan Kwon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/604,179

(22) Filed: May 24, 2017

(65) Prior Publication Data

US 2017/0347229 A1 Nov. 30, 2017

Related U.S. Application Data

(60) Provisional application No. 62/341,047, filed on May 24, 2016, provisional application No. 62/350,682, filed on Jun. 15, 2016, provisional application No. 62/352,007, filed on Jun. 19, 2016.

(51) Int. Cl.
*H04W 76/14* (2018.01)
*H04W 4/80* (2018.01)

(52) U.S. Cl.
CPC .............. *H04W 76/14* (2018.02); *H04W 4/80* (2018.02)

(58) Field of Classification Search
CPC ....... H04W 4/008; H04W 4/80; H04W 76/14; H04W 76/023

USPC ................................................ 455/41.1, 41.2
See application file for complete search history.

(56) References Cited

U.S. PATENT DOCUMENTS

| | | | | |
|---|---|---|---|---|
| 5,999,975 A | * | 12/1999 | Kittaka | G06F 17/30867 707/E17.109 |
| 2014/0378058 A1 | * | 12/2014 | Decuir | H04W 4/80 455/41.2 |
| 2015/0304843 A1 | * | 10/2015 | Hillyard | G06F 8/654 726/5 |
| 2016/0374133 A1 | * | 12/2016 | Logue | H04W 8/005 |

* cited by examiner

*Primary Examiner* — Ayodeji Ayotunde
(74) *Attorney, Agent, or Firm* — Birch, Stewart, Kolasch & Birch, LLP

(57) ABSTRACT

Disclosed is a method and an apparatus for a control device to control a first device by using Bluetooth LE (Low Energy). The present invention provides a method and an apparatus comprising receiving from the first device an advertising message for searching for the first device, transmitting a connection request message for establishing a Bluetooth LE connection to the first device, transmitting to the first device a first read request message requesting first characteristic information related to at least one first service for which the first device operates as a client role, receiving a first read response message including the characteristic information, and controlling a connection with a second device operating as a server role based on the characteristic information.

14 Claims, 26 Drawing Sheets

(a) BR/EDR Protocol Stack (b) LE Protocol Stack

[Fig.1]
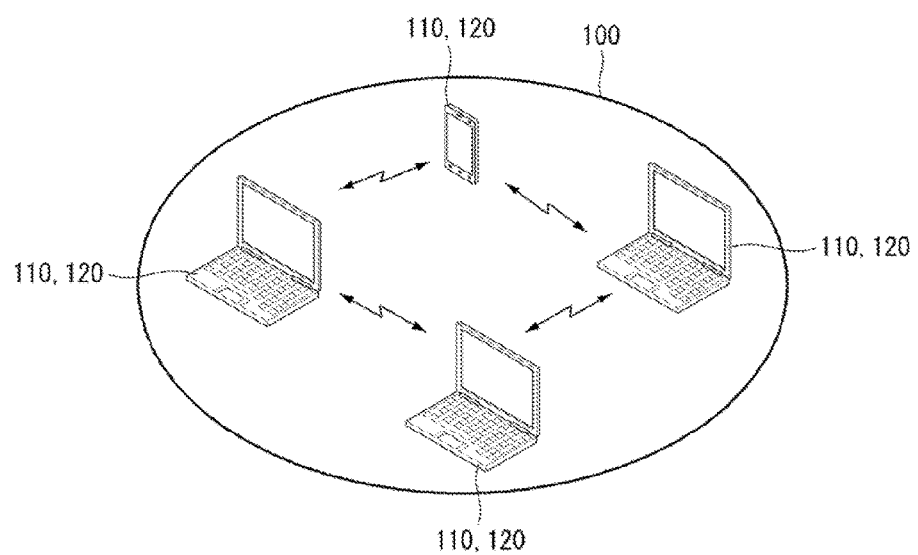

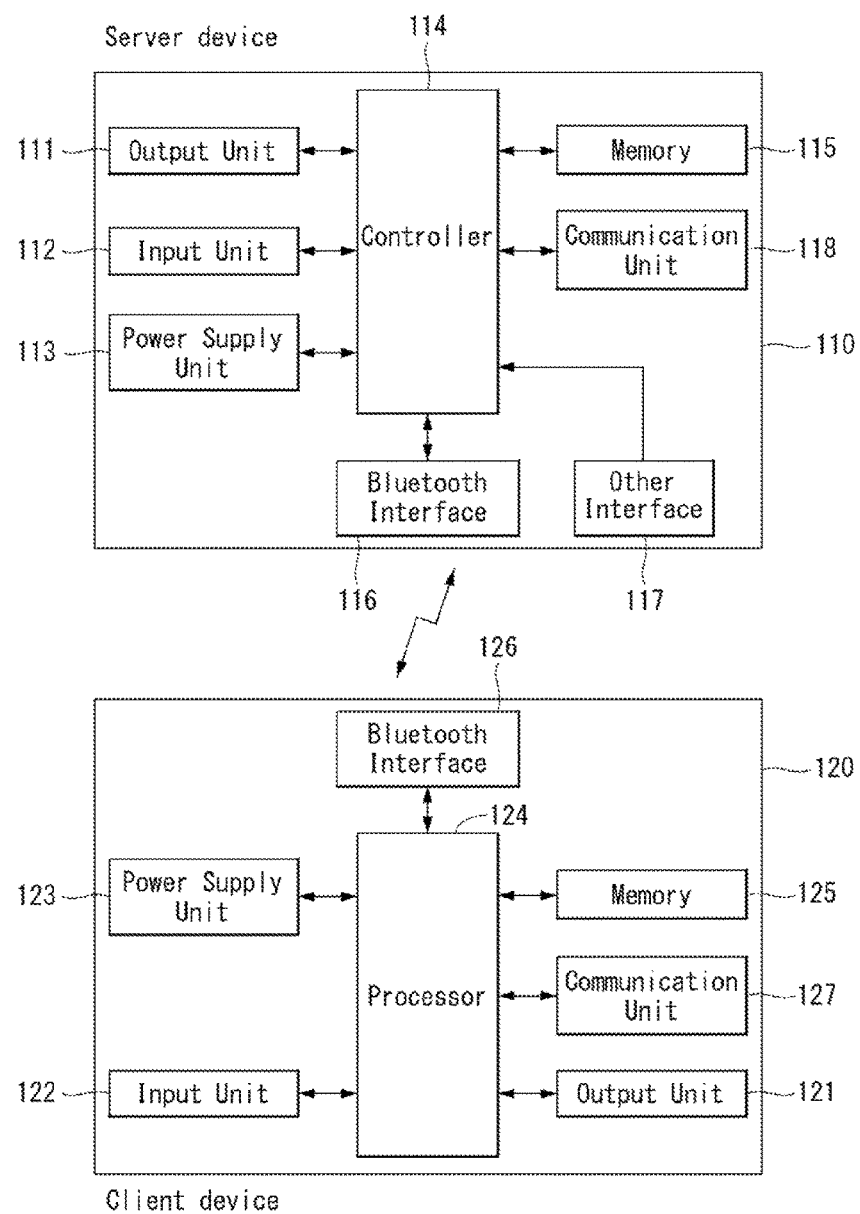
[Fig.2]

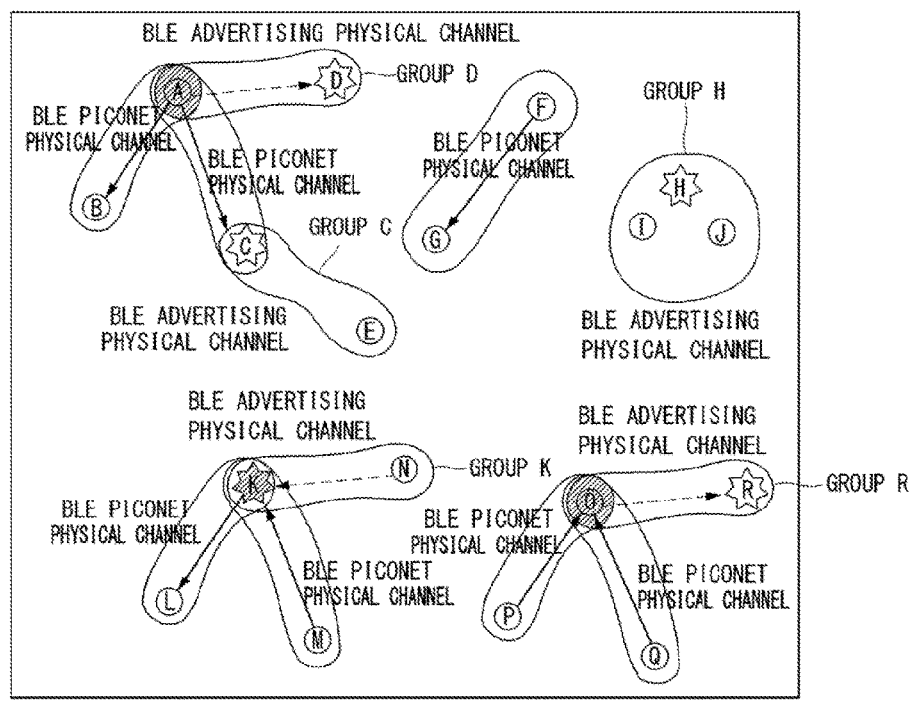
[Fig.3]

[Fig.4]
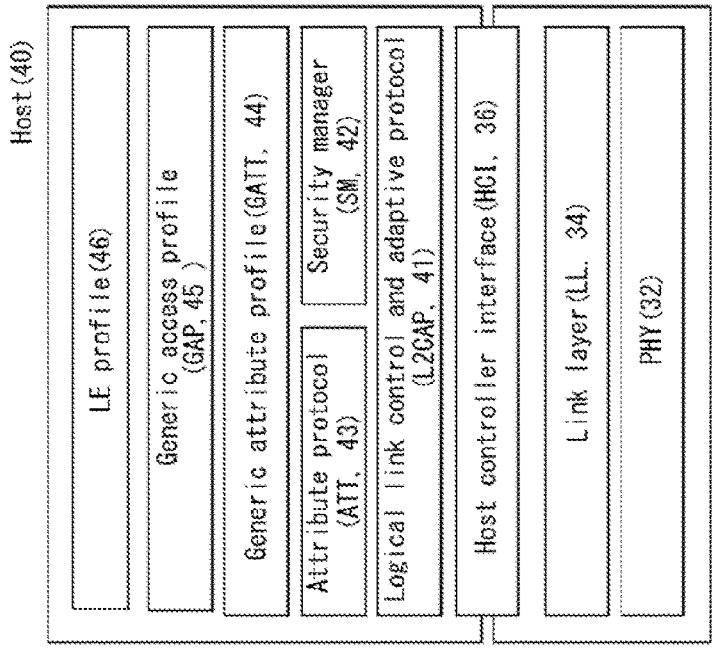
(a) BR/EDR Protocol Stack
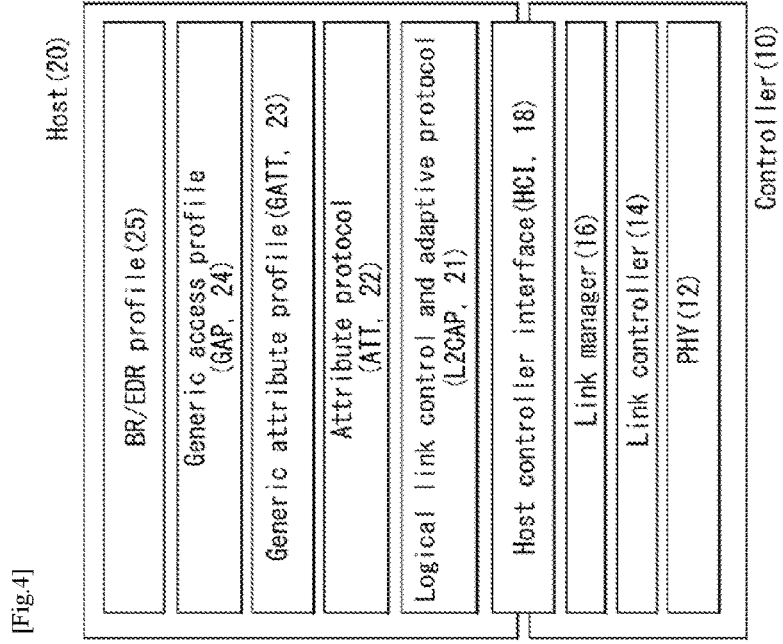
(b) LE Protocol Stack

[Fig.5]
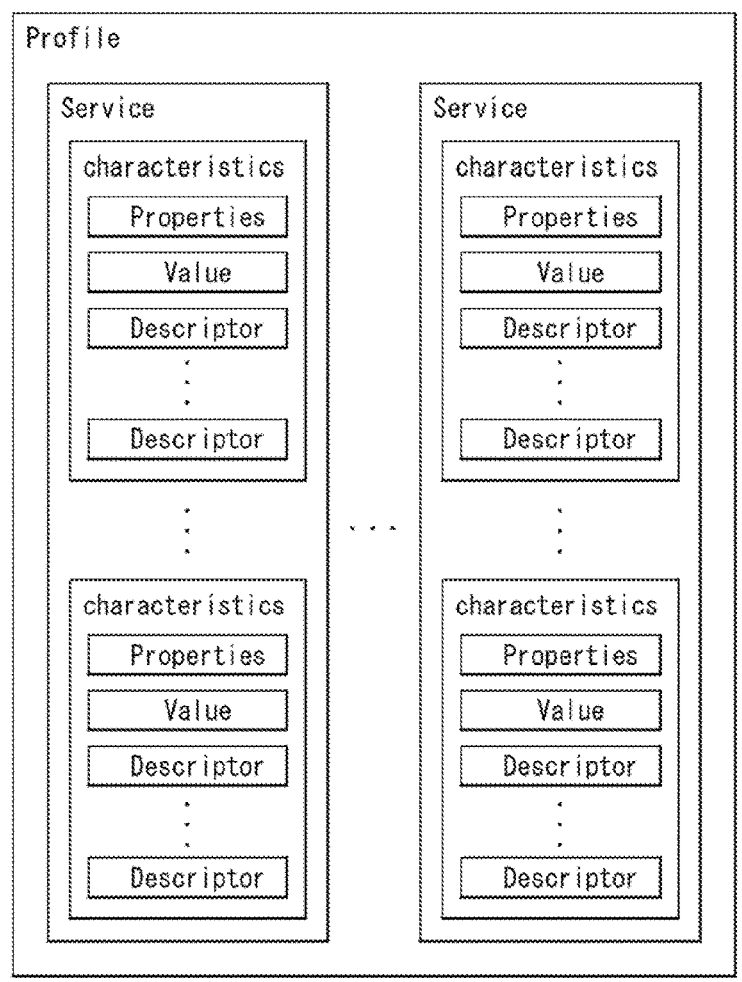

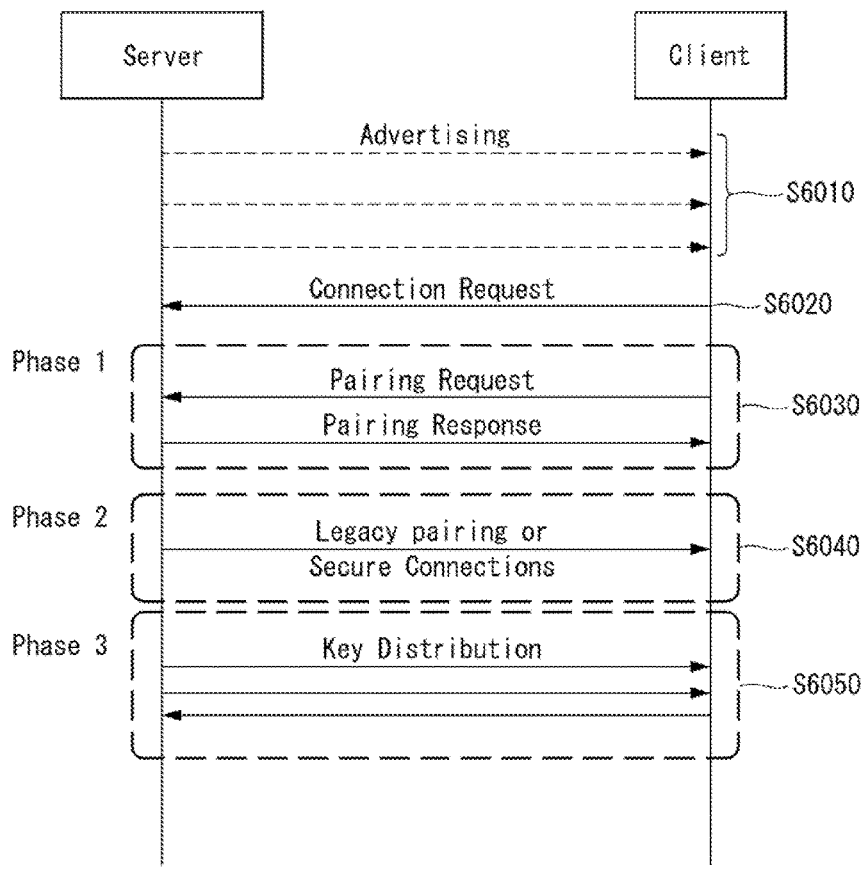

[Fig.7]
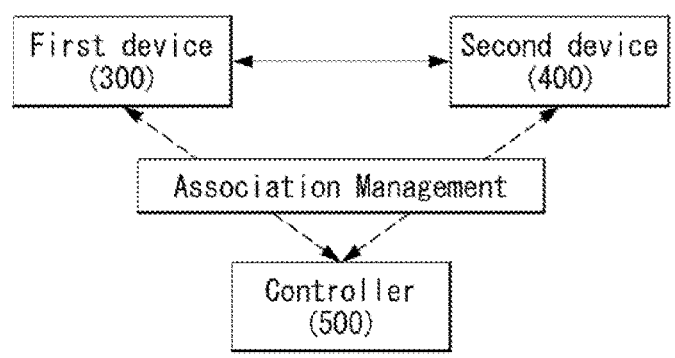

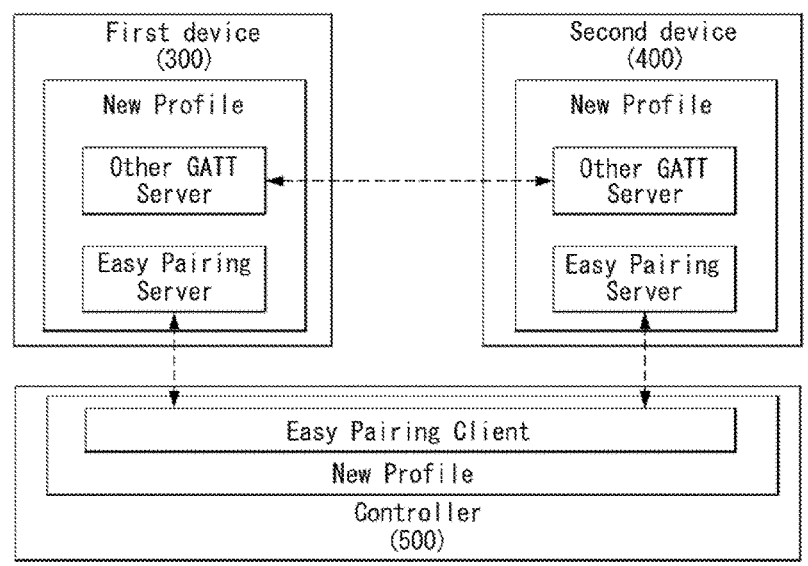
[Fig.8]

[Fig.9]
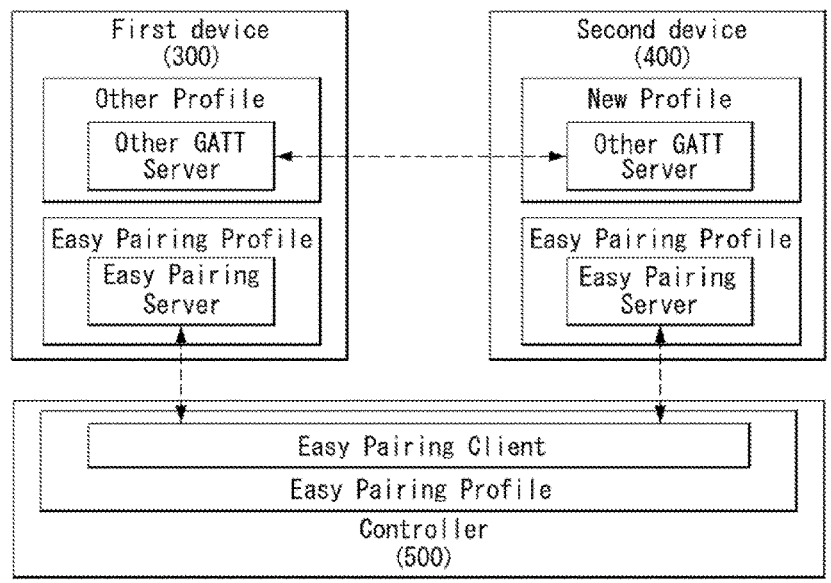

[Fig.10]

| Service Type (1 byte) | Primary Service UUID (Variable - 2bytes, 4bytes, 16bytes) | Security Requirements (1 byte) |
|---|---|---|

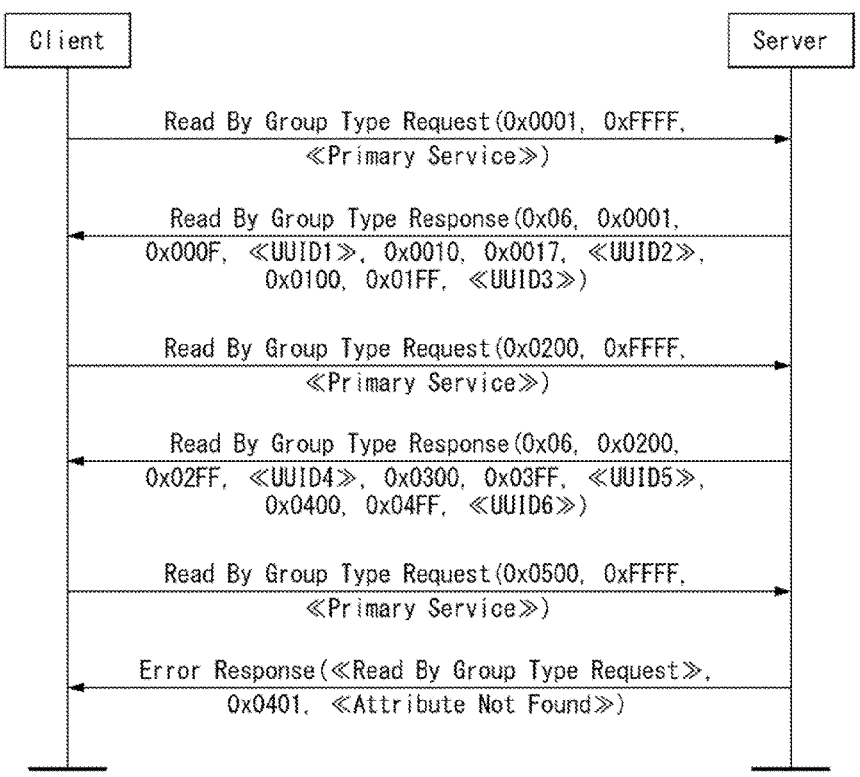
[Fig.11]

[Fig.12]
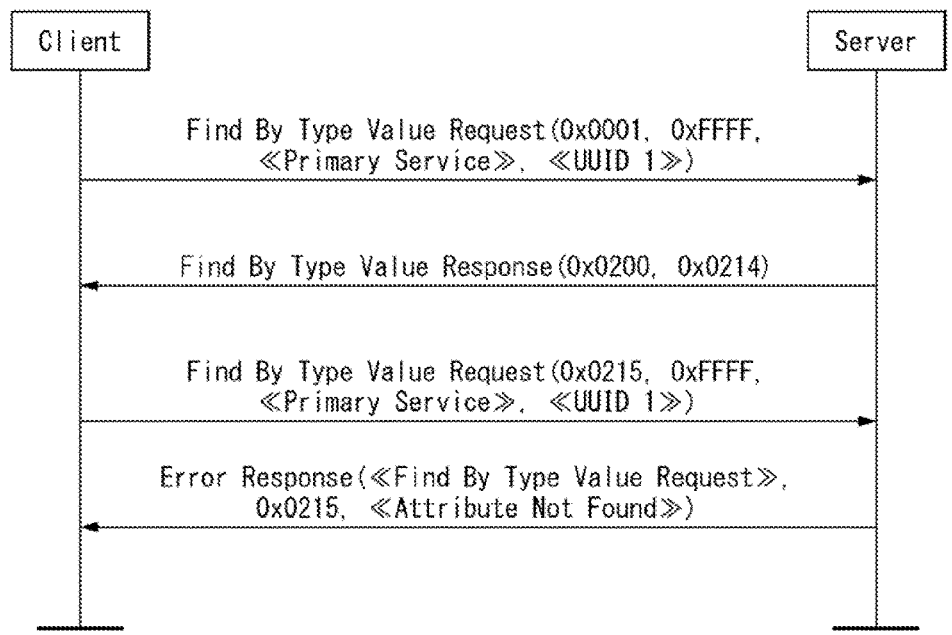

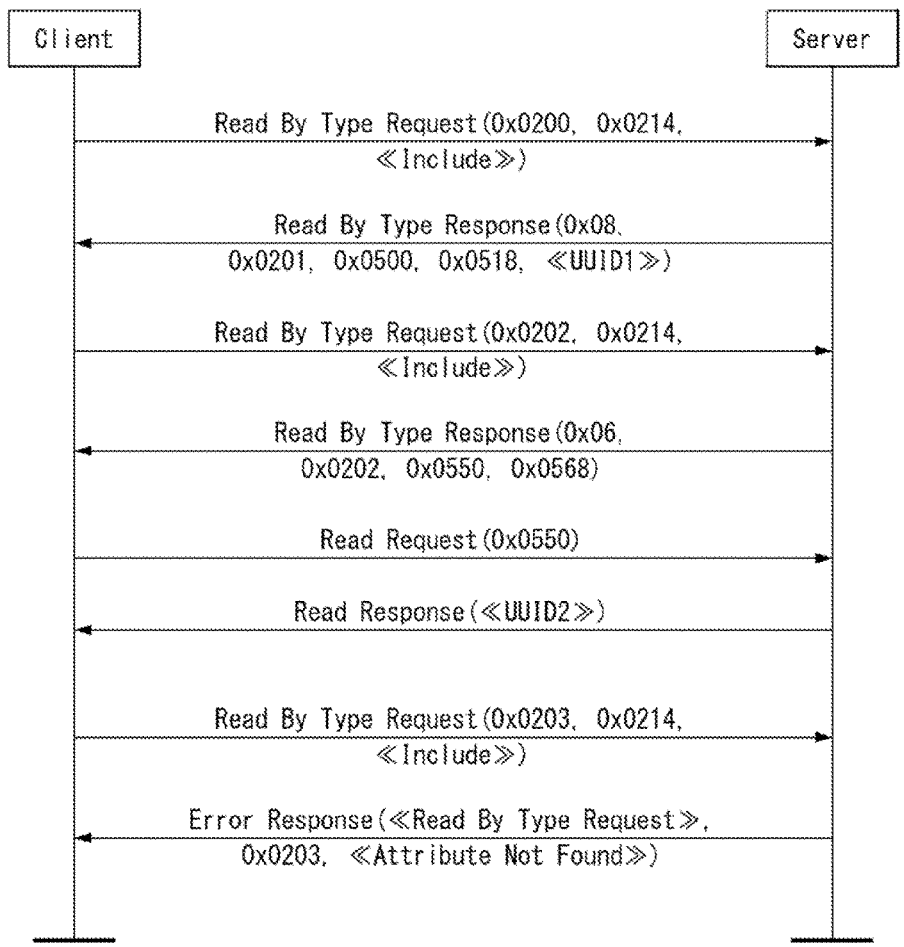
[Fig.13]

[Fig.14]
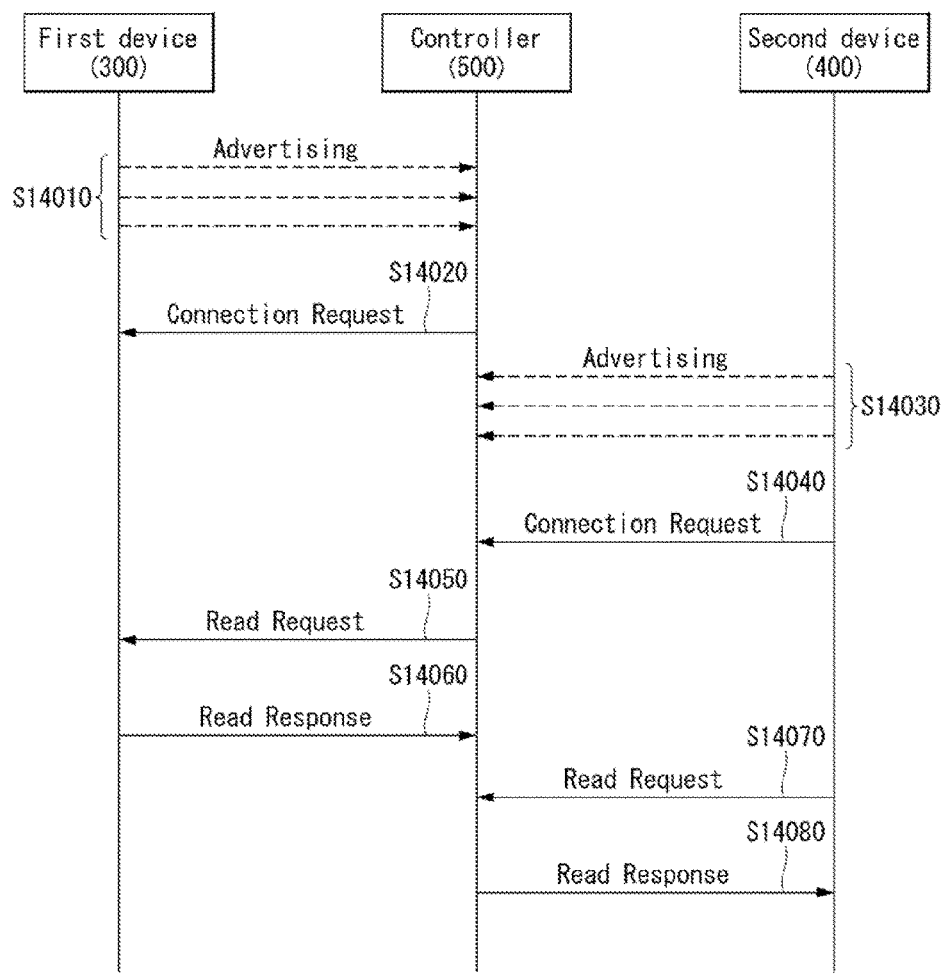

[Fig.15]

| Field Name | Client List Information | Num Of 16bit UUID List | 16bit UUID List | Num Of 32bit UUID List | 32bit UUID List | Num Of 128bit UUID List | 128bit UUID List |
|---|---|---|---|---|---|---|---|
| Data Type | 1byte | 1byte | 16 bits * num of 16 bit UUID list | 1byte | 32 bits * num of 32 bit UUID List | 1byte | 128 bits * num of 128 bit UUID List |

Client List Characteristic

[Fig.16]

| Field Name | Num Of 16bit UUID List | 16bit UUID List |
|---|---|---|
| Data Type | 1byte | 16 bits * num of 16 bit UUID List |

(a) Client List Characteristic

| Field Name | Num Of 32bit UUID List | 32bit UUID List |
|---|---|---|
| Data Type | 1byte | 32 bits * num of 32 bit UUID List |

(b) Client List Characteristic

| Field Name | Num Of 128bit UUID List | 128bit UUID List |
|---|---|---|
| Data Type | 1byte | 128 bits * num of 128 bit UUID List |

(c) Client List Characteristic

[Fig.17]

| 7th bit - 3rd bit | 2nd bit | 1st bit | 0th bit |
|---|---|---|---|
| Reserved For Future Use | 128bit UUID List | 32bit UUID List | 16bit UUID List |

(a) Client List Information 1

| 7th bit | 6th bit | 5th bit | 4th bit | 3rd bit | 2nd bit | 1st bit | 0th bit |
|---|---|---|---|---|---|---|---|
| Reserved For Future Use | Uncompleted 32bit List | Uncompleted 16bit List | Reserved For Future Use | Reserved For Future Use | 128bit UUID List | 32bit UUID List | 16bit UUID List |

(b) Client List Information 2

| 7th bit | 6th bit | 5th bit | 4th bit | 3rd bit | 2nd bit | 1st bit | 0th bit |
|---|---|---|---|---|---|---|---|
| Reserved For Future Use | Reserved For Future Use | Uncompleted 16bit List | Reserved For Future Use | Reserved For Future Use | 128bit UUID List | 32bit UUID List | 16bit UUID List |

(c) Client List Information 3

[Fig.18]

| Field Name | Client List Information | Num Of 16bit UUID List | 16bit UUID List | Num Of 32bit UUID List | 32bit UUID List | Num Of 128bit UUID List | 128bit UUID List |
|---|---|---|---|---|---|---|---|
| Data Type | 1byte | 1byte | 16 bits * num of 16 bit UUID List | 1byte | 32 bits * num of 32 bit UUID List | 1byte | 128 bits * num of 128 bit UUID List |

(a) Server List Characteristic

| 7th bit - 3rd bit | 2nd bit | 1st bit | 0th bit |
|---|---|---|---|
| Reserved For Future Use | 128bit UUID List | 32bit UUID List | 16bit UUID List |

(b) Server List Information

[Fig.19]
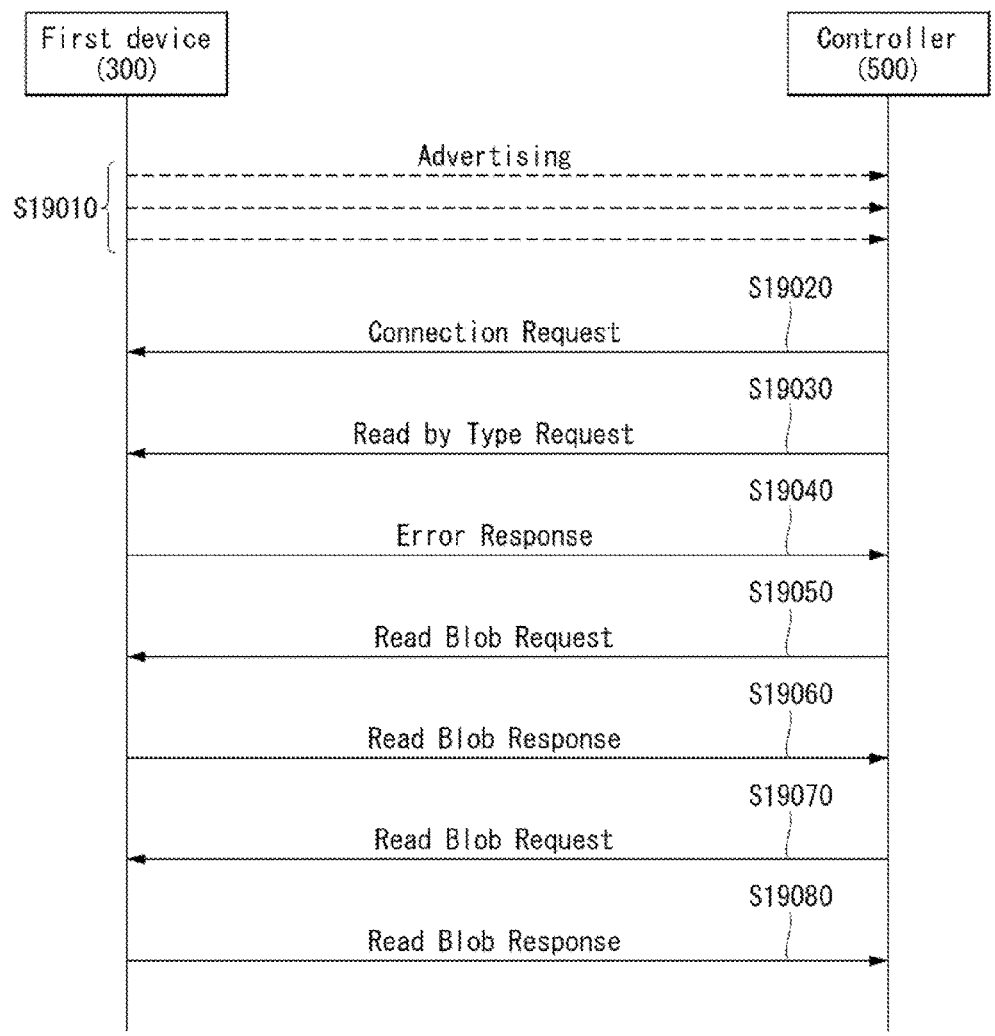

[Fig.20]

(a) Structure Information Characteristic

| Field Name | # of Primary Service | Length of Primary Service | Primary Service Type | Primary Service UUID | Start Handle of Primary Service |
|---|---|---|---|---|---|
| Data Type | 1byte | 1byte | 1byte | Variable | 2bytes |

| End Handle of Primary Service | Length of Included Service | Included Service Type | Included Service UUID | Start Handle of Included Service | End Handle of Included Service |
|---|---|---|---|---|---|
| 2bytes | 1byte | 1byte | Variable | 2bytes | 2bytes |

(b) Service Type

| 7th bit | 6th bit | 5th bit ~ 2nd bit | 1st bit | 0th bit |
|---|---|---|---|---|
| Service1 Type | Changed | Reserved For Future Use | UUID List | |

[Fig.21]
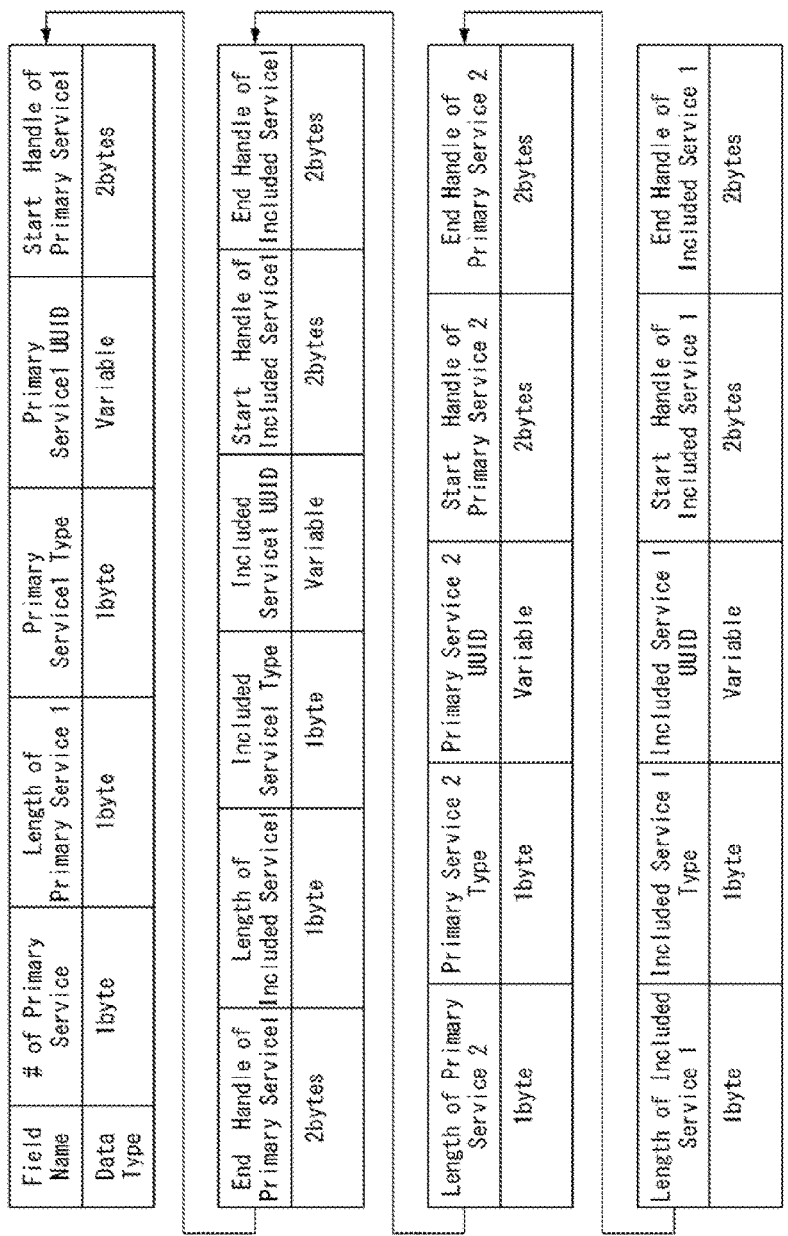

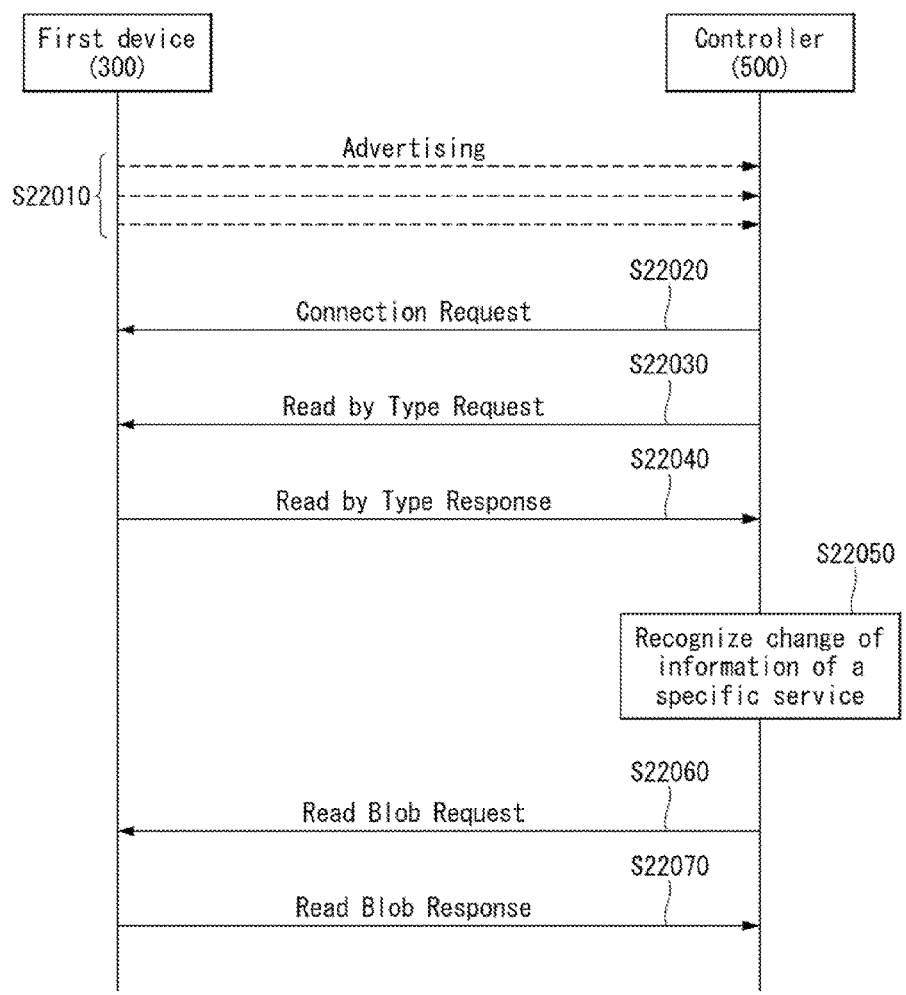

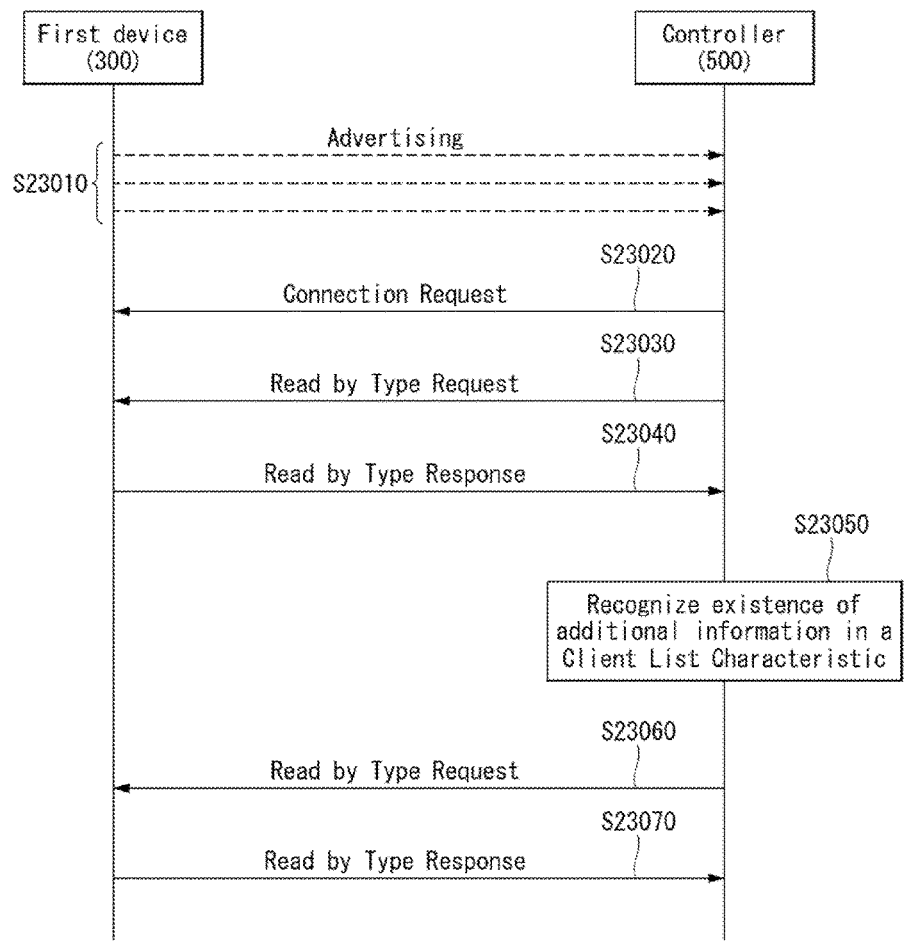

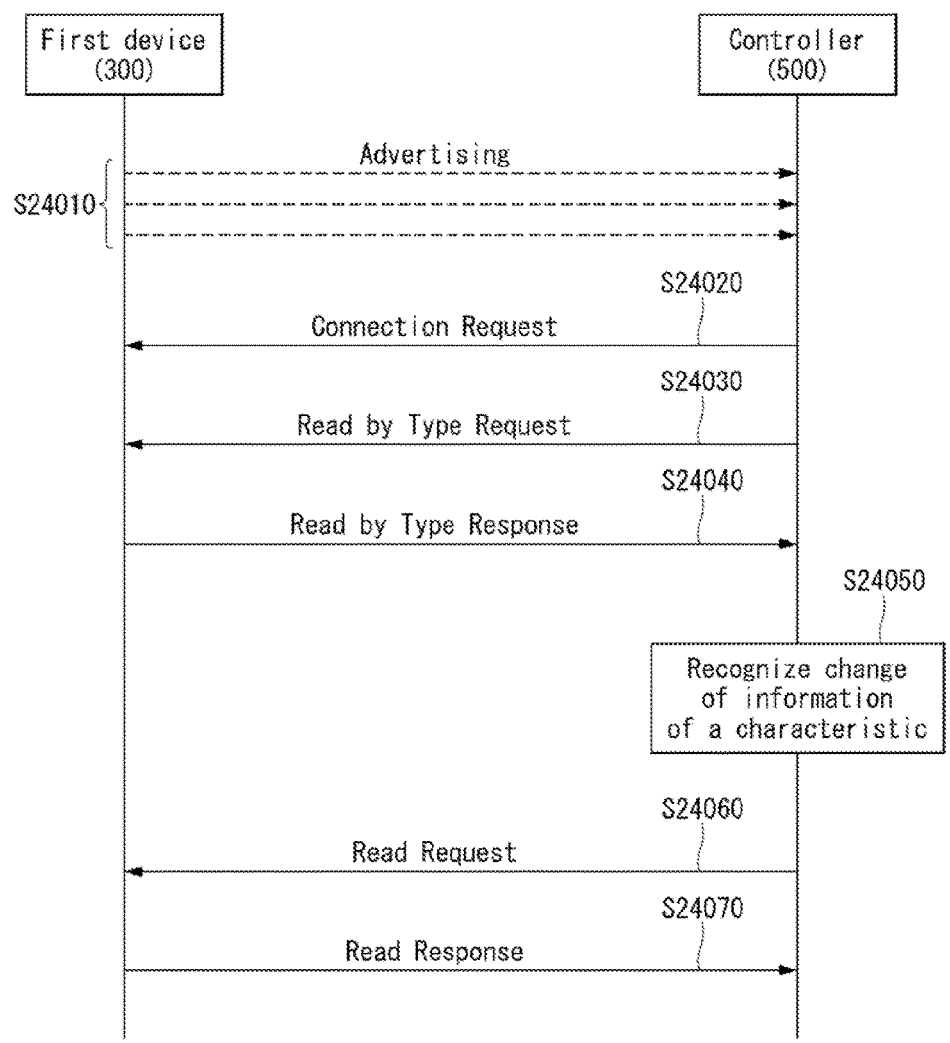
[Fig.24]

[Fig.25]

| Field Name | Number Of Changed Characteristic | Handle of Characteristic | Changed Contents |
|---|---|---|---|
| Data Type | 1byte | 2bytes | 1byte |

(a) Changed Characteristic list Characteristic

| 7th bit | 6th bit | 5th bit | 4th bit | 3rd bit | 2nd bit | 1st bit | 0th bit |
|---|---|---|---|---|---|---|---|
| Changed Method | | Reserved For Future Use | | | | Declaration | Value |

(b) Changed Contents

[Fig.26]

| Field Name | Number Of Changed Characteristic | UUID type | UUID of Characteristic | Changed Contents |
|---|---|---|---|---|
| Data Type | 1byte | 1byte | 2bytes - 16bytes | 1byte |

(a) Changed Characteristic list Characteristic

| 7th bit | 6th bit | 5th bit | 4th bit | 3rd bit | 2nd bit | 1st bit | 0th bit |
|---|---|---|---|---|---|---|---|
| Changed Method | | | Reserved For Future Use | | | Declaration | Value |

(b) Changed Contents

METHOD AND APPARATUS FOR CONTROLLING A DEVICE USING BLUETOOTH TECHNOLOGY

CROSS-REFERENCE TO RELATED APPLICATION

This application claims priority to U.S. Provisional Application No. 62/341,047 filed on May 24, 2016, No. 62/350,682 filed on Jun. 15, 2016, and No. 62/352,007 filed on Jun. 19, 2016, the entire contents of all of which are herein fully incorporated by reference.

BACKGROUND OF THE INVENTION

Field of the Invention

The present invention relates to a method and an apparatus for controlling a device by using Bluetooth, a short-range communication technology in a wireless communication system and more specifically, a method and an apparatus for controlling a device to establish a connection between devices by using Bluetooth technology.

Discussion of the Related Art

Bluetooth is a short-range wireless technology standard that may wirelessly connect various types of devices and allows them to exchange data over short distances. To enable wireless communication between two devices using Bluetooth communication, a user has to perform the process of discovering Bluetooth devices to communicate with and making a connection request. As used herein, the term "device" refers to an appliance or equipment.

In this case, the user may discover a Bluetooth device according to a Bluetooth communication method intended to be used with the Bluetooth device using the Bluetooth device, and then perform a connection with the Bluetooth device.

The Bluetooth communication method may be divided into as a BR/EDR method and an LE method. The BR/EDR method may be called a Bluetooth Classic method. The Bluetooth Classic method includes a Bluetooth technology led from Bluetooth 1.0 and a Bluetooth technology using an enhanced data rate (EDR) supported by Bluetooth 2.0 or a subsequent version.

A BLE technology applied, starting from Bluetooth 4.0, may stably provide information of hundreds of kilobytes (KB) at low power consumption. Such a BLE technology allows devices to exchange information with each other using an attribute protocol. The BLE method may reduce energy consumption by reducing the overhead of a header and simplifying the operation.

Some of the Bluetooth devices do not have a display or a user interface. The complexity of a connection, management, control, and a disconnection between various Bluetooth devices and Bluetooth devices using similar technologies is increasing.

Bluetooth supports a high speed at a relatively low cost with relatively low power consumption. However, Bluetooth is appropriately used within a limited space because it has a maximum transmission distance of 100 m.

SUMMARY OF THE INVENTION

An object of the present invention is to provide a method and an apparatus for controlling a device by using the Bluetooth technology.

Also, an object of the present invention is to provide a method and an apparatus for a control device to control a device to form a connection by obtaining information of services operated as a client from the device by using the Bluetooth technology.

Also, an object of the present invention is to provide a method and an apparatus for a control device to control a device to form a connection by obtaining information of services operated as a server from the device by using the Bluetooth technology Also, an object of the present invention is to provide a method and an apparatus to inform a control device of change of specific information when the specific information of a controlled device is changed.

Also, an object of the present invention is to provide a method and an apparatus for obtaining changed specific information when the specific information of devices controlled by a control device is changed.

Also, in case characteristic information of devices controlled by a control device exceeds a predetermined size, an object of the present invention is to provide a method and an apparatus for obtaining the remaining characteristic information through an additional message.

Technical objects of the present invention are not limited to those described above, but other technical objects not mentioned in this document will be clearly understood from the descriptions given below by those skilled in the art to which the present invention belongs.

To solve the technical problem described above, the present invention provides a method for a first device to control a second device by using the Bluetooth technology.

More specifically, a method for controlling a device by using Bluetooth technology according to one embodiment of the present invention comprises receiving from the first device an advertising message for searching for the first device; transmitting a connection request message for establishing a Bluetooth LE connection to the first device; transmitting to the first device a first read request message requesting first characteristic information related to at least one first service for which the first device operates as a client role; receiving a first read response message including the characteristic information; and controlling a connection with a second device operating as a server role based on the characteristic information.

Also, according to the present invention, the first characteristic information includes at least one of UUID (Universal Unique Identifier) information of the at least one first service, number information of specific-bit UUIDs, or list information of the specific-bit UUIDs.

Also, according to the present invention, the UUID information indicates whether a UUID of the specific bit is existence.

Also, the present invention further comprises transmitting to a first device a second read request requesting structure information of the at least one service; and receiving a second read response message including the structure information.

Also, according to the present invention, the structure information includes first service type information indicating change of information of a primary service and second service type information indicating change of information of secondary service included in the primary service from among the at least one service.

Also, the present invention further comprises transmitting a third read request message requesting information of a changed service to the first device in case the first service type information indicates change of information of the primary service, or in case the second service type information indicates change of information of the secondary service; and receiving a third read request message including information of the changed service from the first device.

Also, according to the present invention, the first read response message includes a specific field indicating existence of additional information of the first characteristic information.

Also, the present invention further comprises transmitting a second read request message requesting the additional information to the first device in case the specific field indicates existence of the additional information; and receiving a read request message including the additional information in response to the second read request message.

Also, the present invention further comprises transmitting a read request message to the second device to transmit a second read request message for requesting second characteristic information related to at least one second service that the second device operates as the server role; and receiving a second read response message including the second characteristic information.

Also, according to the present invention, the second characteristic information includes at least one of UUID (Universal Unique Identifier) information of the at least one second service, number information of specific-bit UUIDs, or list information of the specific-bit UUIDs.

Also, according to the present invention, the UUID information indicates existence of a UUID consisting of the specific number of bits.

Also, a device according to the present invention comprises a communication unit for communicating to and from the outside in a wired or wireless manner; and a processor functionally connected to the communication unit, wherein the processor is configured to receive from the first device an advertising message for searching for the first device, to transmit a connection request message for establishing a Bluetooth LE connection to the first device, to transmit to the first device a first read request message requesting first characteristic information related to at least one first service for which the first device operates as a client role; to receive a first read response message including the characteristic information; and to control a connection with a second device operating as a server role based on the characteristic information.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIG. 1 illustrates one example of a wireless communication system employing Bluetooth Low Energy (LE) technology to which the present invention may be applied.

FIG. 2 illustrates one example of an internal block diagram of a device to which the present invention may be applied.

FIG. 3 illustrates one example of Bluetooth LE topology to which the present invention may be applied.

FIG. 4 illustrates one example of Bluetooth communication architecture to which the present invention may be applied.

FIG. 5 illustrates one example of GATT (Generic Attribute Profile) structure of Bluetooth LE technology to which the present invention may be applied.

FIG. 6 is a flow diagram illustrating one example of a connection method based on Bluetooth LE technology to which the present invention may be applied.

FIG. 7 illustrates a method for controlling other device by using a control device to which the present invention may be applied.

FIGS. 8 and 9 illustrate one example of a profile structure for providing a service for controlling a device to which the present invention may be applied.

FIG. 10 illustrates one example of a structure of service information representing a service for controlling a device to which the present invention may be applied.

FIGS. 11 and 12 are flow diagrams illustrating a method for searching for information of a Primary Service to which the present invention may be applied.

FIG. 13 is a flow diagram illustrating one example of a method for searching for information of an included service related to the primary service.

FIG. 14 is a flow diagram illustrating one example of a method for a controller to obtain service information of devices according to the present invention.

FIGS. 15 to 17 illustrate one example of characteristics related to a service wherein a device operates as a client according to the present invention.

FIG. 18 illustrates one example of characteristic related to a service wherein a device operates as a server according to the present invention.

FIG. 19 illustrates one example of a method for transmitting and receiving specific information through a plurality of messages if the specific information exceeds a predetermined size according to the present invention.

FIGS. 20 and 21 illustrate one example of a characteristic related to a service structure according to the present invention.

FIG. 22 is a flow diagram illustrating one example of a method for transmitting and receiving information of a changed service in case information related to a service changes according to the present invention.

FIG. 23 is a flow diagram illustrating a method for transmitting and receiving additional information through a plurality of messages in case characteristic information may provide additional information according to the present invention.

FIG. 24 is a flow diagram illustrating one example of a method for transmitting and receiving changed characteristic information in case characteristic information is changed according to the present invention.

FIGS. 25 and 26 illustrate one example of characteristics related to change of characteristic information according to the present invention.

DETAILED DESCRIPTION OF THE EMBODIMENTS

The aforementioned objects, features and advantages of the present invention will become more apparent through the following detailed description with respect to the accompanying drawings. Hereinafter, the embodiments of the present invention will be described with reference to the accompanying drawings, in which like numbers refer to like elements throughout the specification. In describing the present invention, a detailed description of known techniques associated with the present invention unnecessarily obscure the gist of the present invention, it is determined that the detailed description thereof will be omitted.

Hereinafter, a terminal related to the present invention will be described in detail with reference to the accompanying drawings. In the following description, usage of suffixes such as 'module', 'part' or 'unit' used for referring to elements is given merely to facilitate explanation of the present invention, without having any significant meaning by itself.

FIG. 1 illustrates one example of a wireless communication system employing Bluetooth Low Energy (LE) technology to which the present invention may be applied.

A wireless communication system 100 includes at least one server device 120 and at least one client device 110.

The server device and the client device perform Bluetooth communication using a Bluetooth low energy (BLE) technology.

First, compared with a Bluetooth basic rate/enhanced data rate (BR/EDR), the BLE technology has a relatively small duty cycle, may be produced at low cost, and significantly reduce power consumption through a low data rate, and thus, it may operate a year or longer when a coin cell battery is used.

Also, in the BLE technology, an inter-device connection procedure is simplified and a packet size is designed to be small compared with the Bluetooth BR/EDR technology.

In the BLE technology, (1) the number of RF channels is forty, (2) a data rate supports 1 Mbps, (3) topology has a scatternet structure, (4) latency is 3 ms, (5) a maximum current is 15 mA or lower, (6) output power is 10 mW (10 dBm) or less, and (7) the BLE technology is commonly used in applications such as a clock, sports, healthcare, sensors, device control, and the like.

The server device 120 may operate as a client device in a relationship with other device, and the client device may operate as a server device in a relationship with other device. That is, in the BLE communication system, any one device may operate as a server device or a client device, or may operate as both a server device and a client device if necessary.

The server device and the client device correspond to major components of the wireless communication system, and the wireless communication system may include components other than the server device and the client device.

The server device refers to a device which receives data from the client device and provides data to the client device in response when a corresponding request is received from the client device, through direct communication with the client device.

Also, in order to provide data information to the client device, the server device sends a notification message or an indication message to the client device in order to provide data information to the client device. Also, the server device receives a confirmation message corresponding to the indication message from the client device.

Also, in the process of transmitting and receiving notification, indication, and confirmation messages to and from the client device, the server device may provide data information to a user through a display unit or may receive a request input from the user through a user input interface.

Also, in the process of transmitting and receiving message to and from the client device, the server device may read data from a memory unit or may write new data to the corresponding memory unit.

Also, the single server device may be connected with a plurality of client devices, and may be easily re-connected with client devices using bonding information.

The client device 120 refers to a device which requests data information and data transmission from the server device.

The client device receives data through a notification message or an indication message from the server device, and when an indication message is received from the server device, the client device sends an acknowledgement message in response to the indication message.

Similarly, in the process of transmitting and receiving messages to and from the server device, the client device may also provide information to the user through a display unit or may receive an input from the user through a user input interface.

Also, in the process of transmitting and receiving messages with the server device, the client device may read data from a memory unit or may write new data to the corresponding memory unit.

Hardware components such as the display units, the user input interfaces, and the memory units of the server device and the client device will be described in detail with reference to FIG. 2.

Also, the wireless communication system may configure personal area networking (PAN) through the Bluetooth technology. For example, in the wireless communication system, a private piconet may be established between devices to quickly and safely exchange files, documents, and the like.

FIG. 2 illustrates one example of an internal block diagram of a device to which the present invention may be applied.

As illustrated in FIG. 2, a server device includes a display unit 111, a user input interface 112, a power supply unit 113, a processor 114, a memory unit 115, a Bluetooth interface 116, other interface 117, and a communication unit (or transceiver unit) 118.

The display unit 111, the user input interface 112, the power supply unit 113, the processor 114, the memory unit 115, the Bluetooth interface 116, other interface 117, and the communication unit 118 are functionally connected to each other to perform a method proposed in this disclosure.

Also, the client device includes a display unit 121, a user input interface 122, a power supply unit 123, a processor 124, a memory unit 125, a Bluetooth interface 126, and a communication unit (or transceiver unit) 128.

The display unit 121, the user input interface 122, the power supply unit 123, the processor 124, the memory unit 125, the Bluetooth interface 126, other interface 127, and the communication unit 128 are functionally connected to each other to perform a method proposed in this disclosure.

The Bluetooth interfaces 116 and 126 refer to units (or modules) able to transmit data such as a request/a response, a command, a notification, an indication/confirmation message between devices.

The memory units 115 and 126 are units implemented in various types of devices, in which various types of data are stored.

The processors 114 and 124 refer to modules controlling a general operation of the server device or the client device, which control requesting transmission of a message through the Bluetooth interface and other interface and processing a received message therethrough.

The processors 114 and 124 may also be termed a controller, a control unit, and the like.

The processors 114 and 124 may include an application-specific integrated circuit (ASIC), other chip set, a logic circuit and/or data processing unit.

The processors 114 and 124 control the communication units to receive an advertising message from the server device, control the communication unit to transmit a scan request message to the server device and receive a scan response message as a response to the scan request from the server device, and control the communication unit to transmit a connection request message to the server device in order to establish a Bluetooth connection with the server device.

Also, after the Bluetooth LE connection is established through the connection procedure, the processors 114 and 124 control the communication units to read or write data by using an attribute protocol from the server device The memory units 115 and 125 may include a read-only memory (ROM), a random access memory (RAM), a flash memory, a memory card, a storage medium and/or other storage device.

The communication units 118 and 127 may include a baseband circuit for processing a wireless signal. When an embodiment is implemented by software, the aforementioned technique may be implemented as a module (process, function, etc.) performing the aforementioned function. The module may be stored in a memory unit and may be executed by a processor.

The memory units 115 may be present within or outside of the processors 114 and 124, and may be connected to the processors 114 and 124 through various well-known units.

The display units 111 and 121 refer to modules providing status information of the devices, message exchange information, and the like, to the user through a screen.

The power supply units 113 and 123 refer to modules which receive external power and internal power and provide power necessary for operation of components under the control of the processor.

As described above, BLE technology has a small duty cycle and can remarkably reduce power consumption through a low data rate.

The input units 112 and 122 refer to modules which provide user input through a screen button, for example, to the controller such that the user can control device operation.

FIG. 3 illustrates one example of Bluetooth LE topology to which the present invention may be applied.

Referring to FIG. 3, a device A corresponds to a piconet (piconet A, the shaded area) master having a device B and a device C as slaves.

In this case, a piconet refers to a set of devices in which one of a plurality of devices functions as a master and the others occupy a shared physical channel connected to the master device.

A BLE slave does not share a common physical channel with a master. Each slave communicates with a master through a separate physical channel. There is another piconet (piconet F) including a master device F and a slave device G.

A device K belongs to a scatternet K. In this case, the scatternet refers to a group of piconets interconnected to each other.

A device K is the master of a device L and also a slave of a device M.

A device O also belongs to a scatternet O. The device O is a slave of a device P and also a slave of a device Q.

FIG. 3 illustrates a case where five different device groups are formed.

A device D is an advertiser, and a device A is an initiator (group D).

A device E is a scanner, and a device C is an advertiser (group C).

A device H is an advertiser, and a device 1 and a device J are scanners (group H).

The device K is also an advertiser, and a device N is an initiator (group K).

A device R is an advertiser, and the device O is an initiator (group R).

The device A and the device B use one BLE piconet physical channel.

The device A and the device C use another BLE piconet physical channel.

In the group D, the device D performs advertising using an advertisement event which may be connected to an advertising physical channel, and the device A is an initiator. The device A may establish a connection to the device D and add a device to the piconet A.

In the group C, the device C performs advertising through an advertising physical channel using a certain type of an advertisement event captured by the scanner device E.

The group D and the group C may use different advertising physical channels or different time frames so as to avoid a collision.

The piconet F has one physical channel. The device F and the device G use a single BLE piconet physical channel. The device F is a master, and the device G is a slave.

The group H has one physical channel. The devices H, I, and J use one BLE advertising physical channel. The device H is an advertiser, and the devices I and J are scanners.

In the scatternet K, the devices K and L use a single BLE piconet physical channel. The devices K and M use another BLE piconet physical channel.

In the group K, the device K performs advertising using an advertisement event which may be connected to an advertising physical channel, and the device N is an initiator. The device N may establish a connection with the device K. In this case, the device K functions as a slave of two devices and also as a master of one device.

In the scatternet O, the devices O and P use a single BLE piconet physical channel. The devices O and Q use different BLE piconet physical channels.

In the group R, the device R performs advertising using an advertisement event which may be connected to an advertising physical channel, and the device O is an initiator. The device O may establish a connection with the device R. In this case, the device O functions as a slave of two devices and also a master of one device.

FIG. 4 illustrates one example of Bluetooth communication architecture to which the present invention may be applied.

Referring to FIG. 4, FIG. 4(*a*) illustrates an example of a Bluetooth BR (Basic Rate)/EDR (Enhanced Data Rate) protocol stack and FIG. 4(*b*) illustrates an example of a Bluetooth LE (Low Energy) protocol stack.

Specifically, as illustrated in FIG. 4(*a*), the Bluetooth BR/EDR protocol stack may include a controller stack 10 and a host stack 20 above and below a host controller interface (HCI) 18.

The host stack (or host module) 20 refers to hardware for transmitting or receiving Bluetooth packets to or from a wireless transceiver module receiving 2.4 GHz Bluetooth signals and is connected to the Bluetooth module corresponding to the controller stack 10 to control the Bluetooth module and perform operations.

The controller stack 10 may include a PHY layer 12, a link controller layer 14 and a link manager layer 16.

The PHY layer 12 transmits and receives 2.4 GHz radio signals and can hop 79 RF channels and transmit data when GFSK (Gaussian Frequency Shift Keying) modulation is used.

The link controller layer 14 serves to transmit digital signals, selects a channel sequence hopping 1400 times per second and transmits a 625 μs time slot per channel.

The link manager layer 16 controls overall operations (link setup, control and security) of Bluetooth connection using LMP (Link Manager Protocol).

The link manager layer 16 may perform the following functions.

The link manager layer 16 may perform ACL/SCO logical transport, logical link setup, and control Detach: The link manager layer 16 stops connection and informs a counterpart device about the reason for stopping connection.

The link manager layer 16 performs power control and role switch.

The link manager layer 16 performs security (authentication, pairing, encryption) function.

The host controller interface layer 18 provides an interface between the host module and the controller module to allow the host to provide a command and data to the controller and allow the controller to provide an event and data to the host.

The host stack (or host module) 20 includes a logical link control and adaptive protocol (L2CAP) 21, an attribute protocol (ATT) 22, a generic attribute profile (GATT) 23, a generic access profile (GAP) 24, and a BR/EDR profile 25.

The logical link control and adaptive protocol (L2CAP) 21 may provide a two-way channels for transmitting data to a specific protocol or a profile.

The L2CAP 21 may multiplex various protocols and profiles provided from a Bluetooth higher position.

The L2CAP of the Bluetooth BR/EDR uses a dynamic channel, supports a protocol service multiplexer, retransmission, and a streaming mode, and provides segmentation and reassembly, per-channel flow control, and error control.

The generic attribute profile (GATT) 23 may operate as a protocol how the attribute protocol 22 is used in configuring services. For example, the generic attribute profile 23 may operate how ATT attributes are grouped together with services, and operate to describe features associated with services.

Thus, the GATT 23 and the ATT 22 may use features in order to describe status and services of a device and describe how the features are related and used.

The attribute protocol 22 and the BR/EDR profile 25 define a service (profile) using the Bluetooth BR/EDR and define an application protocol for exchanging data, and the generic access profile (GAP) 24 defines device discovering, connecting a device and security level.

As illustrated in FIG. 4(*b*), the Bluetooth LE protocol stack includes a controller stack 30 operable to process a wireless device interface for which timing is important and a host stack 40 operable to process high level data.

First, the controller stack 30 may be implemented by using a communication module that may include a Bluetooth wireless device, for example, a processor module that may include a processing device such as a microprocessor.

The host stack may be implemented as part of an OS operated on a processor module or may be implemented as instantiation of a package on the OS.

In some examples, the controller stack and the host stack may be operated or executed on the same processing device within a processor module.

The controller stack 30 includes a physical layer (PHY) 32, a link layer (LL) 34, and a host controller interface (HCI) 36.

The physical layer (PHY) (wireless transceiver module 32), a layer for transmitting and receiving a 2.4 GHz wireless signal, uses a Gaussian frequency shift keying (GFSK) modulation and a frequency hopping technique including forty RF channels.

The link layer 34 serving to transmit or receive a Bluetooth packet provides a function of generating a connection between devices after performing an advertising and scanning function using three advertising channels, and exchanging data packets of a maximum of 257 bytes through thirty-seven data channels.

The host stack may include the Generic Access Profile (GAP) 40, the logical link control and adaptation protocol (L2CAP) 41, the Security Manager (SM) 42, the Attribute Protocol (ATT) 440, the Generic Attribute Profile (GATT) 44, the Generic Access Profile 25 and the LE profile 46. However, the host stack 40 is not limited thereto, but may include other various protocols and profiles.

The host stack multiplexes various protocols and profiles provided from a Bluetooth higher position by using the L2CAP.

First, the L2CAP 41 may provide a single two-way channel for transmitting data to a specific protocol or profile.

The L2CAP 41 may operate to multiplex data between higher layer protocols, segment and reassemble packages, and manage a multicast data transmission.

In the Bluetooth LE, three fixed channels (one for a signaling channel, one for a security manager, and one for an attribute protocol) are basically used, and dynamic channel may be used as necessary.

In contrast, in the BR/EDR, a dynamic channel is basically used, and a protocol service multiplexer, retransmission, streaming mode, and the like, are supported.

The SM 42 is a protocol for certifying a device and providing a key distribution.

The ATT 43 defines a rule for accessing data of a counterpart device by a server-client structure. The ATT 43 includes six types of messages (request, response, command, notification, indication, and confirmation) as follows.

① Request and Response message: A request message is a message for a client device to request specific information from a server device, and the response message, as a response message with respect to the request message, refers to a message transmitted from the server device to the client device.

② Command message: It is a message transmitted from the client device to the server device in order to indicate a command of a specific operation. The server device does not transmit a response with respect to the command message to the client device.

③ Notification message: It is a message transmitted from the server device to the client device in order to notify an event, or the like. The client device does not transmit a confirmation message with respect to the notification message to the server device.

④ Indication and confirmation message: It is a message transmitted from the server device to the client device in order to notify an event, or the like. Unlike the notification message, the client device transmits a confirmation message regarding the indication message to the server device.

The present invention may transmit a data length value from the GATT profile employing the attribute protocol (ATT) 43 upon a request of long data, allowing the client device to know the exact data length and receive a characteristic value from the service device by using the UUID.

The generic access profile (GAP) 45, a layer newly implemented for the Bluetooth LE technology, is used to select a role for communication between Bluetooth LED devices and to control how a multi-profile operation takes place.

Also, the generic access profile (GAP) 45 is mainly used for device discovery, connection generation, and security procedure part, defines a scheme for providing information to a user, and defines types of attributes as follows.

①  Service: It defines a basic operation of a device by a combination of behaviors related to data
②  Include: It defines a relationship between services
③  Characteristics: It is a data value used in a server
④  Behavior: It is a format that may be read by a computer defined by a UUID (value type).

The LE profile 46, including profiles dependent upon the GATT, is mainly applied to a Bluetooth LE device. The LE profile 46 may include, for example, Battery, Time, FindMe, Proximity, Time, Object Delivery Service, and the like, and details of the GATT-based profiles are as follows.

①  Battery: Battery information exchanging method
②  Time: Time information exchanging method
③  FindMe: Provision of alarm service according to distance
④  Proximity: Battery information exchanging method
⑤  Time: Time information exchanging method The generic attribute profile (GATT) 44 may operate as a protocol describing how the attribute protocol (ATT) 43 is used when services are configured. For example, the GATT 44 may operate to define how ATT attributes are grouped together with services and operate to describe features associated with services.

Thus, the GATT 44 and the ATT 43 may use features in order to describe status and services of a device and describe how the features are related and used.

A description will be given of procedures of the BLE technology.

The BLE procedures may be classified into a device filtering procedure, an advertising procedure, a scanning procedure, a discovery procedure and a connection procedure.

Device Filtering Procedure

The device filtering procedure is a method for reducing the number of devices performing a response with respect to a request, indication, notification, and the like, in the controller stack.

When requests are received from all the devices, it is not necessary to respond thereto, and thus, the controller stack may perform control to reduce the number of transmitted requests to reduce power consumption.

An advertising device or scanning device may perform the device filtering procedure to limit devices for receiving an advertising packet, a scan request or a connection request.

Here, the advertising device refers to a device transmitting an advertisement event, that is, a device performing an advertisement and is also termed an advertiser.

The scanning device refers to a device performing scanning, that is, a device transmitting a scan request.

In the BLE, in a case in which the scanning device receives some advertising packets from the advertising device, the scanning device should transmit a scan request to the advertising device.

However, in a case in which a device filtering procedure is used so a scan request transmission is not required, the scanning device may disregard the advertising packets transmitted from the advertising device.

Even in a connection request process, the device filtering procedure may be used. In a case in which device filtering is used in the connection request process, it is not necessary to transmit a response with respect to the connection request by disregarding the connection request.

Advertising Procedure

The advertising device performs an advertizing procedure to perform undirected broadcast to devices within a region.

Here, the undirected broadcast is advertizing toward all the devices, rather than broadcast toward a specific device, and all the devices may scan advertising to make an additional information request or a connection request.

In contrast, directed advertising may make an additional information request or a connection request by scanning advertising for only a device designated as a reception device.

The advertising procedure is used to establish a Bluetooth connection with an initiating device nearby.

Or, the advertising procedure may be used to provide periodical broadcast of user data to scanning devices performing listening in an advertising channel.

In the advertising procedure, all the advertisements (or advertisement events) are broadcast through an advertisement physical channel.

The advertising devices may receive scan requests from listening devices performing listening to obtain additional user data from advertising devices. The advertising devices transmit responses with respect to the scan requests to the devices which have transmitted the scan requests, through the same advertising physical channels as the advertising physical channels in which the scan requests have been received.

Broadcast user data sent as part of advertising packets are dynamic data, while the scan response data is generally static data.

The advertisement device may receive a connection request from an initiating device on an advertising (broadcast) physical channel. If the advertising device has used a connectable advertising event and the initiating device has not been filtered according to the device filtering procedure, the advertising device may stop advertising and enter a connected mode. The advertising device may start advertising after the connected mode.

Scanning Procedure

A device performing scanning, that is, a scanning device performs a scanning procedure to listen to undirected broadcasting of user data from advertising devices using an advertising physical channel.

The scanning device transmits a scan request to an advertising device through an advertising physical channel in order to request additional data from the advertising device. The advertising device transmits a scan response as a response with respect to the scan request, by including additional user data which has requested by the scanning device through an advertising physical channel.

The scanning procedure may be used while being connected to other BLE device in the BLE piconet.

If the scanning device is in an initiator mode in which the scanning device may receive an advertising event and initiates a connection request. The scanning device may transmit a connection request to the advertising device through the advertising physical channel to start a Bluetooth connection with the advertising device.

When the scanning device transmits a connection request to the advertising device, the scanning device stops the initiator mode scanning for additional broadcast and enters the connected mode.

Discovering Procedure

Devices available for Bluetooth communication (hereinafter, referred to as "Bluetooth devices") perform an advertising procedure and a scanning procedure in order to discover devices located nearby or in order to be discovered by other devices within a given area.

The discovering procedure is performed asymmetrically. A Bluetooth device intending to discover other device nearby is termed a discovering device, and listens to discover devices advertising an advertising event that may be scanned. A Bluetooth device which may be discovered by other device and available to be used is termed a discoverable device and positively broadcasts an advertising event such that it may be scanned by other device through an advertising (broadcast) physical channel.

Both the discovering device and the discoverable device may have already been connected with other Bluetooth devices in a piconet.

Connecting Procedure

A connecting procedure is asymmetrical, and requests that, while a specific Bluetooth device is performing an advertising procedure, another Bluetooth device should perform a scanning procedure.

That is, an advertising procedure may be aimed, and as a result, only one device may response to the advertising. After a connectable advertising event is received from an advertising device, a connecting request may be transmitted to the advertising device through an advertising (broadcast) physical channel to initiate connection.

Hereinafter, operational states, that is, an advertising state, a scanning state, an initiating state, and a connection state, in the BLE technology will be briefly described.

Advertising State

A link layer (LL) enters an advertising state according to an instruction from a host (stack). In a case in which the LL is in the advertising state, the LL transmits an advertising packet data unit (PDU) in advertising events.

Each of the advertising events include at least one advertising PDU, and the advertising PDU is transmitted through an advertising channel index in use. After the advertising PDU is transmitted through an advertising channel index in use, the advertising event may be terminated, or in a case in which the advertising device may need to secure a space for performing other function, the advertising event may be terminated earlier.

Scanning State

The LL enters the scanning state according to an instruction from the host (stack). In the scanning state, the LL listens to advertising channel indices.

The scanning state includes two types: passive scanning and active scanning. Each of the scanning types is determined by the host.

Time for performing scanning or an advertising channel index are not defined.

During the scanning state, the LL listens to an advertising channel index in a scan window duration. A scan interval is defined as an interval between start points of two continuous scan windows.

When there is no collision in scheduling, the LL should listen in order to complete all the scan intervals of the scan window as instructed by the host. In each scan window, the LL should scan other advertising channel index. The LL uses every available advertising channel index.

In the passive scanning, the LL only receives packets and cannot transmit any packet.

In the active scanning, the LL performs listening in order to be relied on an advertising PDU type for requesting advertising PDUs and advertising device-related additional information from the advertising device.

Initiating State

The LL enters the initiating state according to an instruction from the host (stack).

When the LL is in the initiating state, the LL performs listening on advertising channel indices.

During the initiating state, the LL listens to an advertising channel index during the scan window interval.

Connection State

When the device performing a connection state, that is, when the initiating device transmits a CONNECT_REQ PDU to the advertising device or when the advertising device receives a CONNECT_REQ PDU from the initiating device, the LL enters a connection state.

It is considered that a connection is generated after the LL enters the connection state. However, it is not necessary to consider that the connection should be established at a point in time at which the LL enters the connection state. The only difference between a newly generated connection and an already established connection is a LL connection supervision timeout value.

When two devices are connected, the two devices play different roles.

An LL serving as a master is termed a master, and an LL serving as a slave is termed a slave. The master adjusts a timing of a connecting event, and the connecting event refers to a point in time at which the master and the slave are synchronized.

Hereinafter, packets defined in an Bluetooth interface will be briefly described. BLE devices use packets defined as follows.

Packet Format

The LL has only one packet format used for both an advertising channel packet and a data channel packet.

Each packet includes four fields of a preamble, an access address, a PDU, and a CRC.

When one packet is transmitted in an advertising physical channel, the PDU may be an advertising channel PDU, and when one packet is transmitted in a data physical channel, the PDU may be a data channel PDU.

Advertising Channel PDU

An advertising channel PDU has a 16-bit header and payload having various sizes.

A PDU type field of the advertising channel PDU included in the heater indicates PDU types defined in Table 1 below.

TABLE 1

| PDU Type | Packet Name |
| --- | --- |
| 0000 | ADV_IND |
| 0001 | ADV_DIRECT_IND |
| 0010 | ADV_NONCONN_IND |
| 0011 | SCAN_REQ |
| 0100 | SCAN_RSP |
| 0101 | CONNECT_REQ |
| 0110 | ADV_SCAN_IND |
| 0111-1111 | Reserved |

Advertising PDU

The following advertising channel PDU types are termed advertising PDUs and used in a specific event.

ADV_IND: Connectable undirected advertising event

ADV_DIRECT_IND: Connectable directed advertising event

ADV_NONCONN_IND: Unconnectable undirected advertising event

ADV_SCAN_IND: Scannable undirected advertising event

The PDUs are transmitted from the LL in an advertising state, and received by the LL in a scanning state or in an initiating state.

Scanning PDU

The following advertising channel DPU types are termed scanning PDUs and are used in a state described hereinafter.

SCAN_REQ: Transmitted by the LL in a scanning state and received by the LL in an advertising state.

SCAN_RSP: Transmitted by the LL in the advertising state and received by the LL in the scanning state.

Initiating PDU

The following advertising channel PDU type is termed an initiating PDU.

CONNECT_REQ: Transmitted by the LL in the initiating state and received by the LL in the advertising state.

Data Channel PDU

The data channel PDU may include a message integrity check (MIC) field having a 16-bit header and payload having various sizes.

The procedures, states, and packet formats in the BLE technology discussed above may be applied to perform the methods proposed in this disclosure.

FIG. 5 illustrates an example of a structure of a GATT (Generic Attribute Profile) of Bluetooth low energy.

Referring to FIG. 5, the structure for exchange of Profile Data of Bluetooth Low Energy will be described.

In detail, the GATT defines a method for exchanging data using a service between Bluetooth LE devices and a characteristic.

In general, a peripheral device (for example, a sensor device) serves as a GATT server, and has definition regarding a service and a characteristic.

In order to read or write data, a GATT client sends a data request to the GATT server, and every operation (transaction) is started by the GATT client and a response is received from the GATT server.

A GATT-based operational structure used in the Bluetooth LE may be a vertical structure as illustrated in FIG. 5 on the basis of a profile, a service, and a characteristic.

The profile includes one or more services, and the services may include one or more characteristics or other services.

The service serves to divide data into logical units and may include one or more characteristics or other services, each of the services has a 16-bit or 128-bit identifier called a universal unique identifier (UUID)).

The characteristic is the lowermost unit in the GATT-based operational structure. The characteristic includes only one data, and has a 16-bit or 128-bit UUID, similar to the service.

The characteristic is defined by values of various types of information, and in order to hold each information, an attribute may be required for each information. The characteristic may use several continuous attributes.

The attribute has four components and has meanings as follows.

handle: Address of attribute
Type: Type of attribute
Value: Value of attribute
Permission: Right to access attribute The present invention proposes a method for acquiring combination information on a device to be controlled by a control device through the GATT and information related to controllable operation to control the device.

FIG. 6 shows an example of a method for the connection procedure of the BLE specification.

A server sends an advertisement message through three advertisement channels (S6010).

The server may be called an advertiser before a connection is established and may be called a master after the connection is established. Examples of the server include sensors (e.g., temperature sensors).

Furthermore, the client may be called a scanner before a connection is established and may be called a slave after the connection is established. The client may be a smart phone, for example.

As described above, Bluetooth communication uses a total of 40 channels through a frequency of 2.4 GHz. Three of the 40 channels are advertisement channels, which are used for exchanging packets to establish a connection in addition to various advertising packets.

The remaining 37 channels are data channels which are used for the exchange of data packets after a connection is established.

After receiving the advertisement message, the client may send a scan request to the server in order to obtain additional data (e.g., a server device name) from the server.

The server sends a scan response, together with the remaining data, to the client in response to the scan request.

In this case, the scan request and the scan response are one type of an advertisement packet which may include only user data of 31 bytes or less.

Therefore, if a data size is larger than 31 bytes, but with large overhead from established connection to send data, the data is divided into two blocks and transmitted twice using the scan request/scan response.

Next, the client sends, to the server, a connection request for establishing BLE with the server (S6020).

Accordingly, a link layer (LL) connection is established between the server and the client.

Thereafter, the server and the client perform a security establishment procedure.

The security establishment procedure may be construed as secure simple pairing or may be performed with the secure simple pairing being included therein.

In other words, the security establishment procedure may be performed through a phase 1 to a phase 3.

More specifically, a pairing procedure (i.e., the phase 1) is performed between the server and the client (S6030).

Through the pairing procedure, the client sends a pairing request to the server, and the server sends a pairing response to the client.

In the phase 2, a legacy pairing or secure connection is performed between the server and the client (S6040).

In the SSP phase 3, a key distribution procedure is performed between the server and the client (S7050).

Through the phases, a secure connection is established between the server and the client, and encrypted data may be transmitted and received.

FIG. 7 illustrates a method for controlling other device by using a control device to which the present invention may be applied.

As shown in FIG. 7, a controller 500 is needed to control the operation between a first device 300 and a second device 400, and the third device 500 needs a new control protocol to control association between the first 300 and the second device 400.

At this time, the controller 500 has to know the information of the devices (for example, interface information and service information) to control the operation of the devices.

Also, in a Bluetooth connection, after devices are connected to each other, a search is conducted to determine which service (application) is provided by an actual device.

The aforementioned procedure is conducted so because the Bluetooth SIG seeks standardization of various applications differently from other connection technologies, and the same Bluetooth device is thus unable to interpret received data if a different application is employed for the device, thereby being unable to provide a service even if data are transmitted and received.

Therefore, after forming a Bluetooth connection, devices have to figure out a service being provided.

However, since the current search method employed by the Bluetooth standard provides only server-based information, the controller, which is a third device, is unable to discover a device performing the role of a client in a specific service. Therefore, in case the controller connects Bluetooth devices, the controller is unable to determine which service is being provided.

Also, in case a client connects one-to-one to a server, the client has no other way to know whether server data has changed. Therefore, to check the changed data, the initial characteristic and service discovery procedure has to be performed again.

Therefore, to solve the technical problem above, the present invention provides a method for a controller to discover a device performing the role of a client and a method for a client to check and receive only the changed data in the event of a change of server data.

FIGS. 8 and 9 illustrate one example of a profile structure for providing a service for controlling a device to which the present invention may be applied.

Referring to FIGS. 8 and 9, a service for a control device to control other devices may be included in the profile of other services or may be defined in a separate profile.

In what follows, the service for the control device to control other devices according to the present invention is called an easy pairing service.

The controller 500 controlling devices may control other devices through the easy pairing service. For example, the controller 500 may control operations related to association between a first device 300 and a second device 400 (for example, connection, pairing, or bonding) through an easy pairing service.

At this time, the easy pairing service may be included in the profile of other service as illustrated in FIG. 8 or may be defined by a separate profile as illustrated in FIG. 9.

As shown in FIG. 8, suppose the easy pairing service is not defined in a separate profile but included in the profile of a specific service. An example of such as case is when the easy pairing service is defined as a secondary service (or as an included service) related to other primary service. In this case, operation of one application may be described in a convenient manner.

However, the easy pairing service may not cover the service based on a profile not including the easy pairing service and requires a clear definition for each individual device.

Furthermore, as shown in FIG. 9, suppose an easy pairing service is defined in a separate profile (for example, in case the easy pairing service is not related to other primary service but defined as an independent primary service or secondary service (or included service)). Then the server-client structure may still be compatible at the profile level, and the easy pairing service may be expanded to include other profiles.

FIG. 10 illustrates one example of a structure of service information representing a service for controlling a device to which the present invention may be applied.

Referring to FIG. 10, as illustrated in FIG. 9, the easy pairing service may be defined as a primary service or an included service.

In case the easy pairing service is defined as a primary service, the following characteristics may be supported.
  It has the Supported Client List which should include same UUID of Target1's Supported Primary Service as the Client function.
  The Supported Client List is used to match the common service capabilities between Targets by the Connection Manager.

If the easy pairing service is defined as an included service of a specific service defined as a primary service, the specific service related to the easy pairing service may be searched for through the characteristics shown in FIG. 10.

The characteristics shown in FIG. 10 are intended to recognize the information of a primary service of the easy pairing service and may comprise a Service Type field, Primary Service UUID, and Security Requirements field.

At this time, properties of the characteristics shown in FIG. 10 and the respective fields are described as follows.
  Properties: Read Characteristic Value
  Service Type: indicate the type (or length) of the followed Primary Service UUID
    0x01: 16 bits UUID
    0x02: 32 bits UUID
    0x03: 128 bits UUID
  Primary Service UUID: indicate the Primary Service UUID including Easy Pairing Service
    Its length depends on the value of Service UUID
  Security Requirements: indicate the Security Requirements of for Primary Service
    0x01: unauthenticated without encryption, no pairing
    0x02: unauthenticated with encryption, Just Works Pairing without Connection Manager
    0x03: authenticated with encryption, Secure Connection via Connection Manager.

FIGS. 11 and 12 are flow diagrams illustrating a method for searching for information of a Primary Service to which the present invention may be applied.

Referring to FIGS. 11 and 12, the client may discover primary services of the server.

Once the primary services are discovered, additional information about the primary services can be accessed using other procedures, including characteristic discovery and relationship discovery to find other related primary and secondary services.

FIG. 11 is a flow diagram illustrating one example of a method for the client to discover all of the primary services of the server.

Referring to FIG. 11, this sub-procedure is used by a client to discover all the primary services on a server.

The Attribute Protocol Read By Group Type Request shall be used with the Attribute Type parameter set to the UUID for «Primary Service».

The Starting Handle shall be set to 0x0001 and the Ending Handle shall be set to 0xFFFF.

Two possible responses can be sent from the server for the Read By Group Type Request: Read By Group Type Response and Error Response.

Error Response is returned if an error occurred on the server.

Read By Group Type Response returns a list of Attribute Handle, End Group Handle, and Attribute Value tuples corresponding to the services supported by the server. Each Attribute Value contained in the response is the Service UUID of a service supported by the server. The Attribute Handle is the handle for the service declaration. The End Group Handle is the handle of the last attribute within the service definition. The End Group Handle of the last service in a device can be 0xFFFF. The Read By Group Type Request shall be called again with the Starting Handle set to one greater than the last End Group Handle in the Read By Group Type Response.

This sub-procedure is complete when the Error Response is received and the Error Code is set to «Attribute Not Found» or when the End Group Handle in the Read by Type Group Response is 0xFFFF.

It is permitted to end the sub-procedure early if a desired primary service is found prior to discovering all the primary services on the server.

FIG. 12 is a flow diagram illustrating one example of a method for the client to discover specific primary services of the server in case the client knows the UUID (Universal Unique Identifier) of the services.

Referring to FIG. 12, the specific primary service may exist multiple times on a server. The primary service being discovered is identified by the service UUID.

The Attribute Protocol Find By Type Value Request shall be used with the Attribute Type parameter set to the UUID for «Primary Service» and the Attribute Value set to the 16-bit Bluetooth UUID or 128-bit UUID for the specific primary service. The Starting Handle shall be set to 0x0001 and the Ending Handle shall be set to 0xFFFF.

Two possible responses can be sent from the server for the Find By Type Value Request: Find By Type Value Response and Error Response.

Error Response is returned if an error occurred on the server.

Find By Type Value Response returns a list of Attribute Handle ranges. The Attribute Handle range is the starting handle and the ending handle of the service definition. The End Group Handle of the last service in a device can be 0xFFFF. If the Attribute Handle range for the Service UUID being searched is returned and the End Found Handle is not 0xFFFF, the Find By Type Value Request may be called again with the Starting Handle set to one greater than the last Attribute Handle range in the Find By Type Value Response.

This sub-procedure is complete when the Error Response is received and the Error Code is set to «Attribute Not Found» or when the End Group Handle in the Find By Type Value Response is 0xFFFF.

It is permitted to end the sub-procedure early if a desired primary service is found prior to discovering all the primary services of the specified service UUID supported on the server.

FIG. 13 is a flow diagram illustrating one example of a method for searching for information of an included service related to the primary service.

Referring to FIG. 13, the Attribute Protocol Read By Type Request shall be used with the Attribute Type parameter set to the UUID for «Include» The Starting Handle shall be set to starting handle of the specified service and the Ending Handle shall be set to the ending handle of the specified service. It is permitted to end the procedure early if a desired included service is found prior to discovering all the included services of the specified service supported on the server.

Two possible responses can be sent from the server for the Read By Type Request: Read By Type Response and Error Response.

Error Response is returned if an error occurred on the server.

Read By Type Response returns a set of Attribute Handle and Attribute Value pairs corresponding to the included services in the service definition. Each Attribute Value contained in the response is composed of the Attribute Handle of the included service declaration and the End Group Handle. If the service UUID is a 16-bit Bluetooth UUID it is also returned in the response. The Read By Type Request shall be called again with the Starting Handle set to one greater than the last Attribute Handle in the Read By Type Response.

The sub-procedure is complete when either the Error Response is received with the Error Code set to Attribute Not Found or the Read By Type Response has an Attribute Handle of the included service declaration that is equal to the Ending Handle of the request.

To get the included service UUID when the included service uses a 128-bit UUID, the Read Request is used. The Attribute Handle for the Read Request is the Attribute Handle of the included service.

However, since length of data that may be transmitted through one message is limited in the Bluetooth LE, all of the service information may not be transmitted through one message transmission when the length of service information is long.

Likewise, as described with reference to FIGS. 11 to 13, it takes a long time to search for a service due to the step-wise service discovery, and because of different UUID lengths among services (for example, 16 bit, 32 bit, and 128 bit), services may not be searched continuously.

Moreover, in the event of a change of a service such as addition of data to the service, removal of the service and/or addition of a new service, indication of the service change may not be notified through the Service Changed indication function if client characteristic configuration is not performed.

Therefore, to solve the technical problem described above, in case the length of service information is long, the present invention provides a method for transmitting and receiving the service information and a method for searching for a specific service immediately.

Also, the present invention provides a method capable of searching for a service continuously even if services have different UUIDs and capable of recognizing a change of service data immediately.

FIG. 14 is a flow diagram illustrating one example of a method for a controller to obtain service information of devices according to the present invention.

Referring to FIG. 14, the controller may obtain information of services in which each individual device operates as a client or a server and control devices operating as a client or a server in a specific service to form a connection to each other in the specific service.

More specifically, a first device 300 transmits an advertising message in the advertising channel so that neighboring devices may search for the first device 300, S14010.

At this time, the advertisement message may include information of services that are supported by the first device 300.

If advertising time is provided according to a predetermined setting or is not configured, the first device 300 may transmit an advertising message continuously.

The controller 500 may discover the first device 300 in case the advertising channel receives the advertising message that is transmitted by the first device 300.

If it is found that the first device 300 is the device to which the controller attempts to form a connection (for example, if the first device 300 provides the easy pairing service), the controller 500 which has discovered the first device 300 transmits a connection request message to the first device 300 to form a Bluetooth LE connection to the first device 300, S14020.

Afterwards, the controller 500 may search for a device to form a Bluetooth LE connection to the first device 300.

To search for a device supporting Bluetooth LE, the controller 500 may receive the advertising message transmitted through advertising channels. If receiving an advertising message transmitted through the advertising channel from a second device 400, the controller 500 may discover the second device 400, S14030.

If it is found that the second device 400 is the device to which the controller attempts to form a connection (for example, if the second device 400 provides the easy pairing service), the controller 500 which has discovered the second device 400 transmits a connection request message to the second device 400 to form a Bluetooth LE connection to the second device 400, S14040.

Afterwards, to connect the first device 300 to the second device 400, the controller 500 has to figure out which role each of the two devices performs in a specific service.

In other words, if both of the first 300 and the second device 400 is incapable of performing the role of a client or a server in the specific service, the specific service may not be provided even if the controller 500 connects the first 300 and the second device 400 to each other.

Therefore, the controller 500 transmits to the first device 300 a Read Request message or Read By Type Request message requesting information of characteristics related to at least one service in which the first device 300 performs the role of a client S14050.

In what follows, the characteristic related to at least one service operating as a client according to the present invention is called Client List Characteristic, and the information included in the Client List Characteristic is called Client List Characteristic Information (or first characteristic information).

In case the controller 500 does not know the handle value of the characteristic in the S14050 step, the Read By Type Request message including the UUID of the characteristic is transmitted to the first device 300; in case the controller 500 knows the handle value of the characteristic, a Read Request message including the handle value is transmitted.

At this time, in case the Read By Type message is transmitted, the Read By Type Request message may include the UUID of the characteristic, Starting Handle number from which reading is started, and Ending Handle number at which reading is terminated.

The first device 300 which has received the Read By Type Request message or Read Request message from the controller 500 transmits to the controller 500 a Read By Type Response message or Read Response message including Client List Characteristic information S14060.

At this time, the Read By Type Response message may include a data list of the characteristic and length values of the data.

The controller 500, which has obtained from the first device 300 information of at least one service in which the first device 300 may operate as a client, transmits to the second device 400 a Read Request message or Read By Type Request message to check whether there exist services in which the second device 400 may operate as a server S14070.

In other words, the controller 500 transmits to the second device 400 a Read Request message or Read By Type message requesting information of characteristics related to at least one service in which the second device 400 operates as a server.

In what follows, the characteristic related to at least one service operating as a server according to the present invention is called Server List Characteristic, and the information included in the Server List Characteristic is called Server List Characteristic Information (or second characteristic information).

In case the controller 500 does not know the handle value of the characteristic in the S14070 step, the Read By Type Request message including the UUID of the characteristic is transmitted to the first device 300; in case the controller 500 knows the handle value of the characteristic, a Read Request message including the handle value is transmitted.

At this time, in case the Read By Type message is transmitted, the Read By Type Request message may include the UUID of the characteristic, Starting Handle number from which reading is started, and Ending Handle number at which reading is terminated.

The second device 400 which has received the Read By Type Request message or Read Request message from the controller 500 transmits to the controller 500 a Read By Type Response message or Read Response message including Server List Characteristic information S14080.

At this time, the Read By Type Response message may include a data list of the characteristic and length values of the data.

The controller 500 may obtain information of services in which the first device 300 operates as a client through the S14050 and S14060 steps and information of services in which the second device 400 operates as a server through the S14070 and S14080 steps.

In case the first device 300 operates as a client and the second device operates as a server in a specific service, the controller 500 may connect the first 300 and the second device 400 through a Bluetooth LE connection, and the first 300 and the second device 400 may provide the specific service after the Bluetooth LE connection is formed.

By using the method described above, the controller 500 may obtain information of services in which a device performs a specific role and control a connection to be formed according to the roles of the respective devices on the basis of the obtained service information.

FIGS. 15 to 17 illustrate one example of characteristics related to a service wherein a device operates as a client according to the present invention.

Referring to FIGS. 15 to 17, the Client List characteristic described in FIG. 14 includes information of each service according to the number of bits comprising the UUID.

More specifically, the Client List characteristic may provide list information of all of the client functions that a device provides. For example, the Client List characteristic may provide information about the functions defined as a primary service and information about the functions defined as an Included service.

The controller 500 may check the client function that a device provides by reading the Client List characteristic through the Read Request message.

Also, a device system has to write the Client List characteristic, and an external device (for example, an unauthenticated device) is not allowed to write the Client List characteristic values.

The 16 bit UUID list field, 32 bit UUID list field, and 128 bit UUID list field of the Client List characteristic may provide information continuously in their default units of 16, 32, and 128 bits, respectively.

The Client List characteristic may be provided as the characteristic of the easy pairing service or as the default characteristic of the GATT profile.

If the controller 500 uses the Read Request By UUID procedure, a data request may be immediately issued without involving Characteristic Discovery.

As shown in FIG. 15, the Client List characteristic may include the following fields.

Client List Information: UUID information of a service operating as a client included in the characteristic Num Of 16 bit UUID List: the number of 16 bit UUID information 16 bit UUID List: list of 16 bit UUID information Num Of 32 bit UUID List: the number of 32 bit UUID information 32 bit UUID List: list of 32 bit UUID information Num Of 128 bit UUID List: the number of 128 bit UUID information 128 bit UUID List: list of 128 bit UUID information The Client List characteristic shown in FIG. 15 includes all of the information of services in which a device operates as a client according to the bit format defined for the respective fields.

FIG. 16 illustrates one example of a Client List characteristic different from that of FIG. 15.

As shown in FIG. 16, the Client List characteristic may be composed to have a different characteristic according to the number of bits employed.

In other words, information of services having a UUID value in 16 bits may be composed as one characteristic, information of services having a UUID value in 32 bits may form another characteristic, and information of services having a UUID value in 128 bits may form a yet another characteristic.

If the characteristics of FIG. 16 are used, characteristic values may be read separately according to their bit formats, leading to reduction of the size of the related message.

The structure of the characteristic shown in FIG. 16 may be used for the structure of the Server List characteristic illustrated in FIG. 14.

FIG. 17 illustrates one example of Client List Information included in the Client List characteristic of FIG. 15.

The Client List Information provides UUID information of a service operating as a client, which is included in the characteristic as described above. In other words, the Client List Information indicates existence of the UUIDs in the respective bit formats.

The 0-th bit of FIG. 17(a) indicates existence of the 16 bit UUID, 1st bit indicates existence of the 32 bit UUID, and 2nd bit indicates existence of the 128 bit UUID.

For example, in case the 0-th bit of FIG. 17(a) is 1, 16 bit UUID information exists, and Num of 16 bit UUID List and 16 bit UUID List fields exist. However, if the 0-th bit is 0, the 16 bit UUID information does not exist, and the Client List characteristic does not include the Num of 16 bit UUID List and 16 bit UUID List fields.

Similarly, in case the 1st bit 1, 32 bit UUID information exists, and Num of 32 bit UUID List and 32 bit UUID List fields exist. However, if the 1st bit is 0, the 32 bit UUID information does not exist, and the Client List characteristic does not include the Num of 32 bit UUID List and 32 bit UUID List fields.

Likewise, in case the 2nd bit 1, 128 bit UUID information exists, and Num of 128 bit UUID List and 128 bit UUID List fields exist. However, if the 2nd bit is 0, the 128 bit UUID information does not exist, and the Client List characteristic does not include the Num of 128 bit UUID List and 128 bit UUID List fields.

FIG. 17(b) illustrates another structure of the Client List Information field.

Each bit shown in FIG. 17(b) is defined as follows.

0-th bit: in case it is 1, 16 bit UUID information exists, and the Client List characteristic includes Num of 16 bit UUID List and 16 bit UUID List fields. However, if the 0-th bit is 0, the 16 bit UUID information does not exist, and the Client List characteristic does not include the Num of 16 bit UUID List and 16 bit UUID List fields.

1st bit: in case it is 1, 32 bit UUID information exists, and the Client List characteristic includes Num of 32 bit UUID List and 32 bit UUID List fields. However, if the 1st bit is 0, the 32 bit UUID information does not exist, and the Client List characteristic does not include the Num of 32 bit UUID List and 32 bit UUID List fields.

2nd bit: in case it is 1, 128 bit UUID information exists, and the Client List characteristic includes Num of 128 bit UUID List and 128 bit UUID List fields. However, if the 2nd bit is 0, the 128 bit UUID information does not exist, and the Client List characteristic does not include the Num of 128 bit UUID List and 128 bit UUID List fields.

5th bit: in case it is 1, it indicates that 16 bit UUID exists, but list information of the entire services is not provided. Therefore, information of services to which 16 bit UUIDs are allocated may be obtained by requesting additional information.

6th bit: in case it is 1, it indicates that 32 bit UUID exists, but list information of the entire services is not provided. Therefore, information of services to which 32 bit UUIDs are allocated may be obtained by requesting additional information.

7th bit: in case it is 1, it indicates that 128 bit UUID exists, but list information of the entire services is not provided. Therefore, information of services to which 128 bit UUIDs are allocated may be obtained by requesting additional information.

FIG. 17(c) illustrates a yet another structure of the Client List Information field.

Each bit shown in FIG. 17(c) is defined as follows.

16 bit UUID List:

0b00: 16 bit UUID List information does not exist

0b01: complete 16 bit UUID information is provided

0b10: incomplete 16 bit UUID information is provided. In case additional information is requested, additional information may be provided.

0b11: incomplete 16 bit UUID information is provided, but additional information is not provided 32 bit UUID List:

0b00: 32 bit UUID List information does not exist

0b01: complete 32 bit UUID information is provided

0b10: incomplete 32 bit UUID information is provided. In case additional information is requested, additional information may be provided.

0b11: incomplete 32 bit UUID information is provided, but additional information is not provided 128 bit UUID List:

0b00: 128 bit UUID List information does not exist

0b01: complete 128 bit UUID information is provided

0b10: incomplete 128 bit UUID information is provided. In case additional information is requested, additional information may be provided.

0b11: incomplete 128 bit UUID information is provided, but additional information is not provided FIG. 18 illustrates one example of characteristic related to a service wherein a device operates as a server according to the present invention.

FIG. 18(a) illustrates one example of a Server List characteristic related to at least one service in which the device described with reference to FIG. 14 operates as a server, and FIG. 18(b) illustrates one example of a field included in the Server List characteristic.

Referring to FIG. 18(a), the Server List characteristic described with reference to FIG. 14 includes information of each service according to the bit format of UUID.

More specifically, the Server List characteristic may provide list information of all of the server functions that a device provides. For example, the Server List characteristic may provide information about the functions defined as a primary service and information about the functions defined as an Included service.

The controller 500 may check the server function that a device provides by reading the Server List characteristic through the Read Request message.

Also, a device system has to write the Server List characteristic, and an external device (for example, an unauthenticated device) is not allowed to write the Server List characteristic values.

The 16 bit UUID list field, 32 bit UUID list field, and 128 bit UUID list field of the Server List characteristic may provide information continuously in their default units of 16, 32, and 128 bits, respectively.

The Server List characteristic may be provided as the characteristic of the easy pairing service or as the default characteristic of the GATT profile.

If the controller 500 uses the Read Request By UUID procedure, a data request may be immediately issued without involving Characteristic Discovery.

As shown in FIG. 18(a), the Server List characteristic may include the following fields.

Server List Information: UUID information of a service operating as a server included in the characteristic
Num Of 16 bit UUID List: the number of 16 bit UUID information
16 bit UUID List: list of 16 bit UUID information
Num Of 32 bit UUID List: the number of 32 bit UUID information
32 bit UUID List: list of 32 bit UUID information
Num Of 128 bit UUID List: the number of 128 bit UUID information
128 bit UUID List: list of 128 bit UUID information The Server List characteristic shown in FIG. 18(a) includes all of the information of services in which a device operates as a client according to the bit format defined for the respective fields.

In another embodiment of the present invention, in addition to the structure shown in FIG. 18(a), the Server List characteristic may be composed to have a different characteristic according to the number of bits employed as shown in FIG. 16.

FIG. 18(b) illustrates one example of Server List Information included in the Server List characteristic shown in FIG. 18(a).

The Server List Information provides UUID information of a service operating as a server, which is included in the characteristic as described above. In other words, the Server List Information indicates existence of the UUIDs in the respective bit formats.

The 0-th bit of FIG. 18(b) indicates existence of the 16 bit UUID, 1st bit indicates existence of the 32 bit UUID, and 2nd bit indicates existence of the 128 bit UUID.

For example, in case the 0-th bit of FIG. 18(b) is 1, 16 bit UUID information exists, and Num of 16 bit UUID List and 16 bit UUID List fields exist. However, if the 0-th bit is 0, the 16 bit UUID information does not exist, and the client List characteristic does not include the Num of 16 bit UUID List and 16 bit UUID List fields.

Similarly, in case the 1st bit 1, 32 bit UUID information exists, and Num of 32 bit UUID List and 32 bit UUID List fields exist. However, if the 1st bit is 0, the 32 bit UUID information does not exist, and the client List characteristic does not include the Num of 32 bit UUID List and 32 bit UUID List fields.

Likewise, in case the 2nd bit 1, 128 bit UUID information exists, and Num of 128 bit UUID List and 128 bit UUID List fields exist. However, if the 2nd bit is 0, the 128 bit UUID information does not exist, and the client List characteristic does not include the Num of 128 bit UUID List and 128 bit UUID List fields.

Also, in another embodiment of the present invention, Server List Information may have the same structure as that of FIG. 17(b) or (c).

FIG. 19 illustrates one example of a method for transmitting and receiving specific information through a plurality of messages if the specific information exceeds a predetermined size according to the present invention.

Referring to FIG. 19, in case the length of specific information is longer than a predetermined length, the specific information may be transmitted after being divided by a predetermined length.

First, the S19010 and S19020 steps are the same as the S14010 and S14020 steps, descriptions thereof will be omitted.

The controller 500, which has formed a Bluetooth LE connection to the first device 300, transmits to the first device 300 a Read By Type Request message or Read Request Message requesting information of the Client List characteristic related to at least one service in which the first device 300 operates as a client S19030.

In case the controller 500 transmits a Read By Type message, the Read By Type Request message may include UUID of the Client List characteristic.

If the length of information of the Client List characteristic is longer than a predetermined length (for example, in case the length is longer than the length that a message may accommodate), the first device 300 is unable to transmit the information of the Client List characteristic to the controller 500 by including the information in the Read By Type Response message.

Therefore, the first device 300 transmits to the controller 500 error information describing the cause of not being able to transmit the characteristic information to the controller 500 and an error response message including the handle information of the Client List characteristic S19040.

At this time, the error information may indicate that the length of the characteristic information is longer than a predetermined length and thus the characteristic information may not be transmitted through the Read By Type Response message.

To receive the information of the Client List characteristic in parts formed by dividing the characteristic information by a predetermined length, the controller 500 transmits handle information included in the error message and a Read Blob Request message including an offset to the first device 300, S19050.

At this time, the first offset value included in the Read Blob Request message is 0.

The first device 300 includes data of the handle information requested through the Read Blob Request message in the Read Blob Response message. The data of the handle information starts from the offset position in the Read Blob Response message. The first device 300 then transmits the Read Blob Response message to the controller 500, S19060.

At this time, the length of information that the first device 300 may transmit through the Read Blob Response message is the same as the ATT_MTU value.

Afterwards, the controller 500 transmits a Read Blob Request message to the first device 300 to request additionally the information to receive the remaining information S19070.

At this time, the offset included in the Read Blob Request message transmitted at the S19070 step represents the position of data to receive by taking into account the length of information that the controller 500 actually receives (for example, in case the controller 500 receives 50 bytes, the offset becomes 51).

The first device 300 transmits the Read Blob Response message to the controller 500. The Read Blob Response message includes the information, the length of which is indicated by ATT_MTU. The offset value specifies the start position of the information in the Read Blob Response message S19080.

By using the method described above, the controller 500 may receive characteristic information over several transmissions even if the size of the characteristic information is larger than a predetermined value.

FIGS. 20 and 21 illustrate one example of a characteristic related to a service structure according to the present invention.

Referring to FIGS. 20 and 21, a device obtains information of a characteristic representing the structure of services that the other device may provide. From the obtained information, the device may obtain information of primary services of the other device and information of Included services related to the primary services.

In what follows, the characteristic representing the structure of services is called Structure Information characteristic.

More specifically, the Structure Information characteristic may include structure information of all of the services that a device may provide.

The controller 500 transmits a Read Request message to the first 300 or second device 400. And the controller 500 may obtain characteristic information (second characteristic information) of the Structure Information characteristic included in the Read Response message transmitted from the first 300 or second device 400.

The controller 500 may check at once the client function or server function that the first 300 or second device 400 may provide through the information of the Structure Information characteristic obtained from the first 300 or second device 400.

A device system has to write the Structure Information characteristic, and an external device (for example, an unauthenticated device) is not allowed to write the Structure Information characteristic values.

As shown in FIG. 20(a), the Structure Information characteristic may include the following fields.

# of Primary Service: the number of Primary Services
Length of Primary Service: a field representing the length of a Primary Service. This field represents the length of information ranging from Primary Service1 Type to a plurality of Included services as shown below.

Information of one Primary Service (Primary Service1 Type, Primary Service1 UUID, Start handle, End Handle)

Information of a plurality of Included Services (Length of Included Service, Included Service1 type, Included Service UUID, Start Handle, End Handle)

In the case of multiple pieces of information about Included Services, the corresponding information is repeated.

Primary Service Type: UUID type of Primary Service.
Primary Service UUID: UUID of Primary Service (16 bit/32 bit/128 bits).
Start Handle of Primary Service1: start handle of Primary Service
End Handle of Primary Service1: end handle of Primary Service
Length of Included Service1: represents the length of Included Service, indicating the length extending from Included Service Type to End handle.
Included Service1 Type: UUID type of Included Service 1.
Included Service UUID: UUID (16 bit/32 bit/128 bits) of Included Service
Start Handle of Included Service: start handle of Included Service
End Handle of Included Service1: end handle of Included Service1

In case the value of # of Primary Service is larger than 1, the fields ranging from the Length of Primary Service field of FIG. 19 to the End Handle of Included Service field may be repeated as many times as the value of # of Primary Service.

FIG. 21 illustrates one example of the Structure Information characteristic in case the value of # of Primary Service is 2 (two primary services are provided).

FIG. 20(b) illustrates one example of Primary Service Type field or Included Service Type field of the Structure Information characteristic.

Each bit in FIG. 20(b) is defined as follows.

7th bit: service type indicating whether a service is Primary service or Included service. For example, 0b0 indicates a Primary service, while 0b1 indicates an Included service.

6th bit: indicates a change in the information of a service, the type of which is determined from the 7th bit. For example, 0b0 indicates that no change has occurred, while 0b1 indicates existence of a change.

1st bit and 0th bit: indicates the number of bits for the UUID of a service, the type of which is determined from the 7th bit. For example, 0b10 indicates a list of 128 bit UUIDs, 0b01 indicates a list of 32 bit UUIDs, and 0b00 indicates a list of 16 bit UUIDs.

By reading the 7th and 6th bit, the controller or client may know which service information has changed and may read again only the service information that has changed.

For example, in case the 7th bit is 0b0, and the 6th bit is 0b1, the controller 500 or client may know that the primary service information has changed and may obtain the changed information by reading the information of the corresponding service again from the start handle to the end handle.

In another embodiment of the present invention, from the hash value of each characteristic, the controller 500 or client may know that the corresponding characteristic value has changed.

For example, in case the hash value of a specific characteristic increases or decreases, the controller 500 or client may recognize that the information of the specific characteristic has changed. By reading the information of the corresponding characteristic again, the controller 500 or client may obtain the changed information.

By using the method described above, in case only the information of a specific service is changed, the changed service information may be figured out without going through the service discovery procedure again from the start, thereby avoiding unnecessarily performing the procedure again.

FIG. 22 is a flow diagram illustrating one example of a method for transmitting and receiving information of a changed service in case information related to a service changes according to the present invention.

Referring to FIG. 22, in case information of a specific service is changed, a device may recognize the information change of the specific service by reading the characteristic representing the information. The device may request and receive the information of the changed service.

First, since the S22010 and S22020 steps are the same as the S14010 and S14020 steps of FIG. 14, descriptions thereof will be omitted.

The controller 500 forms a Bluetooth LE connection to the first device 300. To know the structure of all of the services in which the first device 300 operates as a client, the controller 500 transmits a Read By Type Request message to the first device 300, S22030. The controller 500 uses the Read By Type Request message to request reading of the Structure Information characteristic that represents the structure of the services described with reference to FIG. 20.

At this time, the Read By Type Request message may include the UUID of the Structure Information characteristic.

In case the information of the Structure Information characteristic may be transmitted through the Read By Type Response message, the first device 300 transmits the Read By Type Response message including the information of the Structure Information characteristic to the controller 500, S22040.

However, in case the information of the Structure Information characteristic may not be transmitted through the Read By Type Response message, the information of the Structure Information characteristic may be transmitted to the controller 500 by using the method described with reference to FIG. 19.

The controller 500, which has received the characteristic information from the first device 300, may recognize whether the information of the Primary service or Included service of the first device 300 has changed through the Service Type field described with reference to FIG. 20(*b*) S22050.

If the Service Type field indicates that information of a specific service has changed, the controller 500 may transmit the Read Blob Request message to the first device 300 to request information of the changed service S22060.

At this time, the Read Blob Request message may include the handle value of the changed characteristic and the offset value representing the position of the changed data.

The first device 300 transmits the data of the changed characteristic to the controller 500 through the Read Blob Response message S22060. ATT_MTU specifies the length of the data, and the offset specifies the start position of the data in the Read Blob Response message.

By using the method above, the controller 500 may recognize which service information has changed and may receive only the changed data.

FIG. 23 is a flow diagram illustrating a method for transmitting and receiving additional information through a plurality of messages in case characteristic information may provide additional information according to the present invention.

Referring to FIG. 23, in the presence of additional information in the characteristic information of the server, the controller 500 or client may transmit a message requesting additional information and obtain the additional information.

First, since the S23010 and S23020 steps are the same as the S14010 and S14020 steps, descriptions thereof will be omitted.

Afterwards, the controller 500, which has formed a Bluetooth LE connection to the first device 300, transmits to the first device 300 a Read By Type Request message or Read Request Message requesting information of the Client List characteristic related to at least one service in which the first device 300 operates as a client S23030.

The first device 300 transmits a Read By Type Response message including information of the Client List characteristic to the controller 500, S23040.

At this time, if the structure of the Client List Information of the Client List characteristic is the same as that of FIG. 17(*c*), the controller 500 may recognize existence of additional information through the Client List Information field.

If each UUID List is 0b01 or 0b11, the controller 500 determines that the first device 300 is incapable of providing additional information and terminates the procedure.

However, if the UUID List is 0b11, the controller 500 determines that the first device 300 has transmitted incomplete information.

In other words, the controller 500 determines that the first device 300 has transmitted only part of the Client List characteristic and is capable of transmitting additional information of the Client List characteristic S23050.

The controller 500, which has recognized existence of additional information and the first device's capability of transmitting the additional information, may transmit a Read By Type Request message requesting additional information to the first device 300 and receive a Read By Type Response message including the additional information from the first device 300, S23060, S23070.

At this time, the controller 500 may request the additional information by including the UUID value of the corresponding characteristic in the Read By Type Request message and transmitting the Read By Type Request message.

Also, the Read By Type Response message may include the length and data of the attribute having the UUID included in the Read By Type Request message.

By using the method described above, the controller 500 may determine existence of additional information in a specific characteristic and the first device's capability of providing the additional information and may receive the additional information.

FIG. 24 is a flow diagram illustrating one example of a method for transmitting and receiving changed characteristic information in case characteristic information is changed according to the present invention.

Referring to FIG. 24, in case characteristic information of a device is changed, the device may read a specific characteristic, recognize whether the characteristic information has changed, and obtain changed characteristic information.

First, since the S24010 and S24020 are the same as the S14010 and S14020 of FIG. 14, descriptions thereof will be omitted.

The controller 500, which has formed a Bluetooth LE connection to the first device 300, transmits to the first device 300 a Read By Type Request message requesting characteristic information related to change of characteristic values to check whether the characteristic values of the first device 300 have changed S24030.

In what follows, the characteristic related to a change of characteristic value according to the present invention is called Changed Characteristic list Characteristic, and information included in the Changed Characteristic list Characteristic is called Changed Characteristic list Characteristic Information.

At this time, a Read By Type Request message may include the UUID of the Changed Characteristic list Characteristic.

The first device 300 transmits to the controller 500 a Read By Type Response message including the length and data of the attribute to which the UUID of the Changed Characteristic list Characteristic is allocated S24040.

The controller 500 may determine whether there is a changed characteristic from among the characteristics of the first device 300 through the value of the Changed Characteristic list Characteristic S24050.

If there is a changed characteristic, the controller 500 transmits a Read Request message requesting the value of the changed characteristic to the first device 300, S24060.

At this time, the Read Request message may include the handle information of the changed characteristic.

The first device 300 transmits to the controller 500 a Read Response message including the value of the characteristic to which a UUID requested by the controller 500 is allocated S24070.

By using the method described above, the controller 500 may recognize a change of a characteristic of the first device 300 and receive the changed characteristic value.

If more than one characteristic values have changed, the controller 500 may perform the S24060 and S24070 steps repeatedly to receive a plurality of changed characteristic values.

In the present embodiment, characteristics are public characteristics and may employ specific handle values.

Also, in the case of public characteristic, by performing the Read Long Characteristic Value procedure without involving the characteristic discovery procedure, the controller may request information easily.

FIGS. 25 and 26 illustrate one example of characteristics related to change of characteristic information according to the present invention.

Referring to FIGS. 25 and 26, the Changed Characteristic list Characteristic described with reference to FIG. 24 may include information related to the characteristic changed in a device.

More specifically, in case the Changed Characteristic list Characteristic includes changes of characteristics of all of the changed services in a specific device, the device may include only one Changed Characteristic list Characteristic.

However, in case the Changed Characteristic list Characteristic provides changed characteristics of the respective services, the Changed Characteristic list Characteristic may exist for each service.

If the client reads the Changed Characteristic list Characteristic, the client may know the changed characteristic information in the server and read the information of the changed characteristic selectively.

Therefore, a client reconnecting to a server may read changed information of a characteristic without performing the characteristic discovery again, thereby reducing connection and data transmission time.

The information of the corresponding characteristic has to be written for each device or service, and an external device (for example, an unauthenticated device) is not allowed to write the Structure Information Characteristic values.

FIG. 25(a) illustrates one example of the structure of the Changed Characteristic list Characteristic.

As shown in FIG. 25(a), the Changed Characteristic list Characteristic may include the following fields.

Number Of Changed Characteristic: the number of changed characteristics

Handle of Characteristic: handle value (position value) of a characteristic, information of which has changed Changed Contents: changed contents of a characteristic If the value of Number Of Changed Characteristic field is larger than one, Handle of Characteristic field and Changed Contents field are repeated as many times as the value of the Number Of Changed Characteristic field.

FIG. 25(b) illustrates one example of Changed Contents field of FIG. 25(a).

If the 0th bit of the Changed Contents field is '1', it indicates that the value of a characteristic has been changed, while, if the 0th bit is '0', it indicates that the value of the characteristic remains the same.

If the 1st bit is '1', it indicates that the declaration part of the characteristic has been changed, while, if the 1st bit is '0', it indicates that the declaration part remains the same as before.

The Changed Method field indicates addition, removal, or change of a characteristic. For example, each bit of the Changed Method field may be defined as follows.

0b00: Added (it indicates that a new characteristic has been generated. Both of the 0th and 1st bit must have a value of '0'. Also, the client has to newly read the corresponding value from the server.)

0b01: Deleted (it indicates that an existing characteristic has been deleted. Both of the 0th and 1st bit must have a value of '0'. Also, the client has to delete the stored value of the characteristic.)

0b10: Modified (it indicates that an existing characteristic has been modified. According to the value of the 0th or 1st bit, it indicates that the corresponding value or declaration part has been modified. The client has to newly read the modified value from the server.)

FIG. 26(a) illustrates another example of a structure of Changed Characteristic list Characteristic.

As shown in FIG. 26(a), the Changed Characteristic list Characteristic may include the following fields.

Number Of Changed Characteristic: the number of changed characteristics

UUID type: UUID type of a characteristic. It defines the UUID type of a characteristic included in the next field (for example, 01 indicates a 16 bit UUID, 02 indicates a 32 bit UUID, and 03 indicates a 128 bit UUID).

UUID of Characteristic: UUID of a modified characteristic

Changed Contents: changed contents of a characteristic

If the value of Number Of Changed Characteristic field is larger than one, UUID type field, UUID of Characteristic field, and Changed Contents field are repeated as many times as the value of the Number Of Changed Characteristic field.

FIG. 26(b) illustrates one example of the Changed Contents field of FIG. 26(a), and descriptions thereof will be omitted since this example is the same as that of FIG. 25(b).

Although the method described in FIGS. 19 to 26 has been described with respect to the embodiments employing the controller 500 and the first device 300 operating as a client, the method may also be applied to the case employing the controller 500 and the second device 400 operating as a server.

According to a method for controlling a device by using the Bluetooth technology according to one embodiment of the present invention, a control device may control forming a connection to other device.

Also, according to the present invention, forming a connection between devices may be controlled according to their role in a service by obtaining information of services in which a device operates as a client and/or information of services in which a device operates as a server.

Also, according to the present invention, in case the size of characteristic information is larger than a predetermined value, the remaining information may be obtained through an additional message by informing a control device of existence of the characteristic information.

Also, according to the present invention, in case service information of controlled devices is changed, a control device may obtain only the changed service information by transmitting to the control device the information specifying the service, the information of which has been changed.

Also, according to the present invention, in case characteristic information related to a service of controlled devices is changed, a control device may obtain only the changed characteristic information by transmitting to the control device the information specifying the characteristic, the information of which has been changed.

The advantageous effects that may be obtained from the present invention are not limited to those described above, and other effects not mentioned above may be understood clearly by those skilled in the art to which the present invention belongs from the following descriptions.

Although the present invention has been described on the basis of the Bluetooth LE technology, but the present invention may also be applied to the Bluetooth BR/EDR.

In this document, for the convenience of description, the present invention has been described according to the respective drawings; however, it is equally possible to design a new embodiment by merging the embodiments described in the respective drawings. Also, depending on the needs of those skilled in the art, designing a computer-readable recording medium in a computer storing a program for running the embodiments previously described also belongs to the technical scope of the present invention.

The method for controlling a device using Bluetooth technology according to the present invention is not limited to the embodiments described above, but the entire or part of the embodiments may be combined selectively so that various modifications may be made to the embodiments.

Meanwhile, the method for controlling a device using Bluetooth technology according to the present invention may be implemented in the form of processor-readable program codes in a recording medium that may be read by a processor installed in a network device. The processor-readable recording medium includes all kinds of recording devices storing data that may be read by the processor. Examples of processor-readable recording media include ROM, RAM, CD-ROM, magnetic tape, floppy disk, optical data storage device, and implementation in the form of carrier waves such as transmission through the Internet. Also, the processor-readable recording medium may be distributed over computer systems connected to each other through a network so that processor-readable codes may be stored and executed in a distributed manner.

Throughout the document, preferred embodiments of the present invention have been described with reference to appended drawings; however, the present invention is not limited to the embodiments above. Rather, it should be noted that various modifications of the present invention may be made by those skilled in the art to which the present invention belongs without leaving the technical scope of the present invention defined by the appended claims, and these modifications should not be understood individually from the technical principles or aspects of the present invention.

The present document describes both of the product invention and the process invention, and depending on the needs, descriptions of the respective inventions may be applied in a supplementary manner.

What is claimed is:

1. A method for a control device to control at least one of a connection or a pairing between a first device and a second device using a short-range wireless communication system, the method comprising:
    transmitting by the control device to the first device, a first read request message requesting an attribute value of a characteristic including a first list information indicating services in which the first device operates as a client role;
    receiving, by the control device, a first read response message including the first list information;
    transmitting, by the control device to the second device, a second read request message requesting an attribute value of a characteristic including a second list information indicating services in which the second device operates as a server role;
    receiving, by the control device, a second read response message including the second list information; and
    controlling, by the control device the at least one of the connection or the pairing between the first device and the second device based on the first list information and the second list information,
    wherein the first list information includes primary service information and secondary service information in which the first device operates as the client role,
    wherein the second list information includes primary service information and secondary service information in which the second device operates as the server role, and
    wherein the secondary service information represents a service included in the primary service information to provide a primary service.

2. The method of claim 1, wherein the first list information includes at least one of Universal Unique Identifier (UUID) information of services, number information of specific-bit UUIDs, or list information of the specific-bit UUIDs.

3. The method of claim 2, wherein the UUID information indicates whether a UUID of a specific bit exists.

4. The method of claim 1, further comprising:
    transmitting, to the first device, a third read request requesting structure information of the services; and
    receiving a third read response message including the structure information.

5. The method of claim 1, wherein the first read response message includes a specific field indicating existence of additional information of the first list information.

6. The method of claim 5, further comprising:
transmitting, to the first device, a third read request message requesting the additional information in case the specific field indicates existence of the additional information; and
receiving, a third read response message including the additional information in response to the third read request message.

7. A control device for controlling at least one of a connection or a pairing between a first device and a second device using a short-range wireless communication system, the control device comprising:
a transceiver; and
a processor functionally connected to the transceiver, wherein the processor is configured to:
control the transceiver to transmit, to the first device, a first read request message requesting an attribute value of a characteristic including a first list information indicating services in which the first device operates as a client role
control the transceiver to receive a first read response message including the first list information,
control the transceiver to transmit, to the second device, a second read request message requesting an attribute value of a characteristic including a second list information indicating services in which the second device operates as a server role,
control the transceiver to receive a second read response message including the second list information, and
control the at least one of the connection or the pairing between the first device and the second device based on the first list information and the second list information,
wherein the first list information includes primary service information and secondary service information in which the first device operates as the client role,
wherein the second list information includes primary service information and secondary service information in which the second device operates as the server role, and
wherein the secondary service represents a service included in the primary service information to provide a primary service.

8. The control device of claim 7, wherein the first list information includes at least one of Universal Unique Identifier (UUID) information of the services, number information of specific-bit UUIDs, or list information of the specific-bit UUIDs.

9. The control device of claim 8, wherein the UUID information indicates whether a UUID of a specific bit exists.

10. The control device of claim 7, wherein the processor is further configured to:
control the transceiver to transmit, to the first device, third read request requesting structure information of the services; and
control the transceiver to receive a third read response message including the structure information.

11. The control device of claim 10, wherein the structure information includes first service type information indicating a change of the primary service information and second service type information indicating a change of the secondary service information.

12. The control device of claim 7, wherein the processor is further configured to:
control the transceiver to transmit to the first device a third read request message requesting the additional information in case the specific field indicates existence of the additional information; and
control the transceiver to receive a third read response message including the additional information in response to the third read request message.

13. The method of claim 1, further comprising:
receiving, from the first device, a first advertising message for searching for the first device,
wherein the first advertisement message includes service information indicating that an easy pairing service for controlling and managing the at least one of the connection or the pairing between the first device and the second device is supported; and
transmitting, to the first device, a first connection request message for establishing a connection with the first device.

14. The method of claim 1, further comprising:
receiving a message including an attribute value of a characteristic indicating a change of the primary service information and the secondary service information from a server, when a part of the primary service information and the secondary service information are changed;
transmitting, to the server, a request message for requesting changed information of the primary service information and the secondary service information upon recognizing the change of the primary service information and the secondary service information based on the attribute value; and
receiving a response message including the changed information in response to the request message.

* * * * *